United States Patent
Yanagi et al.

(10) Patent No.: US 8,530,543 B2
(45) Date of Patent: Sep. 10, 2013

(54) INK COMPOSITION, INK SET AND INK-JET RECORDING METHOD

(75) Inventors: Terukazu Yanagi, Kanagawa (JP); Takahiro Ishizuka, Kanagawa (JP); Akio Tamura, Kanagawa (JP); Takahiro Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 637 days.

(21) Appl. No.: 12/543,522

(22) Filed: Aug. 19, 2009

(65) Prior Publication Data

US 2010/0062160 A1 Mar. 11, 2010

(30) Foreign Application Priority Data

Sep. 11, 2008 (JP) .................. 2008-233988

(51) Int. Cl.
- *C09D 11/10* (2006.01)
- *B05D 5/06* (2006.01)
- *C08K 5/05* (2006.01)

(52) U.S. Cl.
USPC ............. 523/160; 524/556; 427/256; 347/96; 347/100

(58) Field of Classification Search
USPC ....................................................... 523/160
See application file for complete search history.

(56) References Cited

U.S. PATENT DOCUMENTS

| | | | |
|---|---|---|---|
| 2001/0009933 A1* | 7/2001 | Miyabayashi | 523/160 |
| 2003/0008938 A1* | 1/2003 | Sano et al. | 523/160 |
| 2005/0282930 A1* | 12/2005 | Fu et al. | 523/160 |

FOREIGN PATENT DOCUMENTS

| | | |
|---|---|---|
| JP | 7-032721 A | 2/1995 |
| JP | 9-207424 A | 8/1997 |
| JP | 11-269206 A | 10/1999 |
| JP | 2006-307078 A | 11/2006 |
| JP | 2007-145924 A | 6/2007 |
| WO | 2004/029164 A | 4/2004 |

OTHER PUBLICATIONS

Ulrich Poth's "Automotive Coatings Formulation: Chemistry, Physics and Practices", Vincentz Network GmbH & Co KG, 2008, p. 33.*
Oh et al. Progress in Organic Coatings, 72(3), 2011, 253-259.*

* cited by examiner

*Primary Examiner* — Vu A Nguyen

(74) *Attorney, Agent, or Firm* — Solaris Intellectual Property Group, PLLC

(57) ABSTRACT

There are provided an ink composition including a coloring material, a hydrophilic organic solvent, polymer particles that have a minimum filming temperature ($MFT^{disp}$) of 60° C. or more when dispersed in water and that have a MFT 40° C. or more lower than the $MFT^{disp}$ when mixed with water and 25 mass % of the hydrophilic organic solvent based on a solid content of the polymer, and water; an ink set including the ink composition and a treating liquid capable of forming an aggregate upon contact with the ink composition; and an ink-jet recording method using the ink composition or the ink set.

16 Claims, No Drawings

INK COMPOSITION, INK SET AND INK-JET RECORDING METHOD

CROSS-REFERENCE TO RELATED APPLICATION

This Application claims priority under 35 USC 119 from Japanese Patent Application No. 2008-233988 filed on Sep. 11, 2008, the disclosure of which is incorporated by reference herein.

BACKGROUND OF THE INVENTION

1. Field of the Invention

The present invention relates to an ink composition suitable for use in image recording in which ink is ejected by an ink-jet method. The invention also relates to an ink set and an ink-jet recording method using the ink composition.

2. Description of the Related Art

Ink-jet recording methods use a large number of nozzles arranged in an ink-jet head, from which ink droplets are ejected when recording is performed. Ink-jet recording methods are widely used, because they make it possible to record high-quality images on a variety of recording media.

Known ink-jet recording methods include two-liquid reaction type recoding methods in which two liquids: ink and a treating liquid for aggregating the ink are allowed to react with each other so that the ink is aggregated, which facilitates fixing of the ink. For example, a known ink-jet recording method includes depositing, on a recording medium, an ink composition containing a pigment and a resin emulsion and a reactive liquid containing a polyvalent metal salt. It is considered that according to this method, image blurring or image unevenness can be reduced (see for example Japanese Patent Application Laid-Open (JP-A) No. 07-32721).

On the other hand, when recording is performed on plain paper or the like, sufficient performance sometimes cannot be obtained with respect to, for example, fixing property (for example, scratch resistance) or resolution, in addition to color forming density. In particular, this is the case when increasing the speed of ink-jet recording, and a recording method more suitable for high speed recording using a single pass system capable of recording by one operation of a head, as opposed to a shuttle scanning system, is in demand.

After the recording, a sheet of paper or the like is placed on the recorded image in various cases such as collection and storage. If sticking, adhesion, or the like occurs between the image portion and a sheet of paper or the like placed thereon, various problems such as damage to the image and degradation of handleability may occur. In order to obtain images free from sticking and so on, methods of increasing the filming temperature or Tg (glass transition temperature) of the resin component of the ink may be used. However, if Tg or the like is raised, the temperature necessary for heat treatment to achieve fixing performance such as scratch resistance will be raised, which increases the thermal energy consumption for the fixing.

In this regard, a specific ink-jet recording method is disclosed, which includes the steps of providing an ink composition containing a resin emulsion having a minimum filming temperature of 50° C. or more, writing an ink image with the ink composition on a transfer medium whose surface is heated to a temperature equal to or higher than the minimum filming temperature of the resin emulsion, evaporating the solvent component of the ink image on the transfer medium, and transferring the ink image from the transfer medium to a recording medium (see for example JP-A No. 07-32721).

It has been found that when the ink composition used is prepared such that the Minimum Filming Temperature (hereinafter also abbreviated as "MFT") of polymer particles in the ink composition can be kept at a relatively low level at the image recording stage and such that after the recording, the MFT can be changed to a relatively high level over time or by heating for drying or the like, both anti-blocking property and scratch resistance can be imparted to image portions, while thermal energy can be saved. The invention has been made based on the finding.

SUMMARY OF THE INVENTION

The present invention has been made in view of the above circumstances and provides an ink composition, an ink set, and an ink-jet recording method.

A first aspect of the invention provides <1> an ink composition, including: a coloring material; a hydrophilic organic solvent; polymer particles that have a minimum filming temperature ($MFT^{disp}$) of 60° C. or more when dispersed in water and that have a $MFT^{disp}$ 40° C. or more lower than the $MFT^{disp}$ when mixed with water and 25 mass % of the hydrophilic organic solvent based on a solid content of the polymer; and water.

A second aspect of the invention provides an ink set including the ink composition of the first aspect and a treating liquid capable of forming an aggregate upon contact with the ink composition.

A third aspect of the invention provides an ink-jet recording method including: applying the ink composition of the first aspect to a recording medium by an ink-jet method; and applying, to the recording medium, a treating liquid capable of forming an aggregate upon contact with the ink composition.

DETAILED DESCRIPTION OF THE INVENTION

The ink composition of the present invention, the ink set of the invention therewith, and the ink-jet recording method of the invention therewith are described in detail below.

Ink Composition

The ink composition of the invention includes at least a coloring material, a hydrophilic organic solvent, polymer particles, and water, wherein the polymer particles have a minimum filming temperature ($MFT^{disp}$) of 60° C. or more when dispersed in water and also have a MFT at least 40° C. lower than the $MFT^{disp}$ when mixed with water and 25 mass % of the hydrophilic organic solvent based on a solid content of the polymer (hereinafter, such a MFT is also abbreviated as "$MFT^{25\% \, aq}$").

If necessary, the ink composition of the invention may also include a dispersant, a surfactant, or other components.

According to the invention, the particulate resin component includes polymer particles capable of changing in such a way as to satisfy the relationship $MFT^{disp} - MFT^{25\% \, aq} \geq 40°$ C., wherein $MFT^{disp}$ is the MFT of the polymer particles in an aqueous dispersion, and $MFT^{25\% \, aq}$ is the MFT of the polymer particles in an aqueous solution containing the hydrophilic organic solvent. As a result, the minimum filming temperature (MFT) of the polymer particles in the ink composition containing the organic solvent is kept at a relatively low level, but after droplets of the ink composition are ejected and deposited on a recording medium, the ink solvent is absorbed into the recording medium and undergoes other processes such that, due to elapse of time after recording, drying and the like, the ink solvent is released from the ink, which increases the MFT of the polymer particles. Therefore, even when polymer particles having a relatively low MFT or a relatively low glass transition point (Tg) are used so that fixing performance such as scratch resistance can be ensured with relatively low thermal energy, images in which the occurrence of blocking is suppressed can be obtained.

(Coloring Material)

The ink composition used in the invention may contain at least one coloring material. As the coloring material, any one of conventional dyes, pigments and the like may be used without particular limitation. Among the coloring materials, a coloring material that is substantially insoluble or sparingly soluble in water is preferred from the standpoint of ink coloring properties. Specific examples of the coloring material include various pigments, disperse dyes, oil-soluble dyes and dyestuffs forming J aggregate. Pigments are more preferred.

In the invention, the water-insoluble pigment itself or the pigment itself surface-treated with a dispersant can be used as the water-insoluble colored particles.

In the invention, the pigment may be of any type, and any conventional organic and inorganic pigments may be used. Examples of the pigments include organic pigments such as azo lakes, azo pigments, polycyclic pigments such as phthalocyanine pigments, perylene and perinone pigments, anthraquinone pigments, quinacridone pigments, dioxazine pigments, diketopyrrolopyrrole pigments, thioindigo pigments, isoindolinone pigments, and quinophthalone pigments, dye lakes such as basic dye lakes and acidic dye lakes, nitro pigments, nitroso pigments, aniline black, and daylight fluorescent pigments; and inorganic pigments such as titanium oxide, iron oxide pigments, and carbon black pigments. Though not listed in the Color Index, any pigment capable of being dispersed in an aqueous phase may also be used. As a matter of course, a product produced by surface-treating the pigment with a surfactant, a polymer dispersant or the like, or graft carbon or the like may also be used. Among the pigments, in particular, azo pigments, phthalocyanine pigments, anthraquinone pigments, quinacridone pigments, or carbon black pigments are preferably used.

Specific examples of the organic pigment that may be used in the invention will be described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

(Dispersant)

In the invention, when the coloring material is a pigment, it is preferably dispersed with a dispersant in an aqueous solvent. The dispersant may be a polymer dispersant or a low-molecular-weight, surface-active dispersant. The polymer dispersant may be any of a water-soluble dispersant and a water-insoluble dispersant.

The low-molecular-weight, surface-active dispersant (hereinafter also referred to as "low-molecular-weight dispersant") may be added in order that an organic pigment may be stably dispersed in the aqueous solvent while the viscosity of the ink may be kept low. As used herein, the term "low-molecular-weight dispersant" refers to a dispersant with a molecular weight of 2,000 or less. The molecular weight of the low-molecular-weight dispersant is preferably from 100 to 2,000, more preferably from 200 to 2,000.

The low molecular-weight dispersant has a structure containing a hydrophilic group and a hydrophobic group. At least one of each of the hydrophilic group and the hydrophobic group may be independently contained in one molecule, and the low molecular-weight dispersant may have plural hydrophilic groups and plural hydrophobic groups. The low molecular-weight dispersant can appropriately have a linking group for linking the hydrophilic group and the hydrophobic group.

The hydrophilic group may be an anionic group, a cationic group, a nonionic group, or a betaine type group having a combination thereof.

The anionic group is preferably a phosphate group, a phosphonate group, a phosphinate group, a sulfate group, a sulfonate group, a sulfinate group, or a carboxy acid group, more preferably a phosphate group or a carboxy acid group, further preferably a carboxy acid group, while it may be any group having negative charge.

The cationic group is preferably an organic cationic substituent, more preferably a nitrogen- or phosphorus-containing cationic group, further preferably a nitrogen-containing cationic group, while it may be any group having positive charge. In particular, the cationic group is preferably a pyridinium cation or an ammonium cation.

The nonionic group may be of any type, as long as it has neither negative nor positive charge. For example, it may be part of polyalkylene oxide, polyglycerin or any sugar unit, or the like.

It is preferred in the invention that the hydrophilic group is an anionic group from the standpoints of dispersion stability and aggregation properties of a pigment.

When the low molecular-weight dispersant has an anionic hydrophilic group, its pKa is preferably 3 or more from the standpoint of accelerating an aggregation reaction when contacted with an acidic treating liquid. The pKa of the low molecular-weight dispersant herein is a value experimentally obtained from a titration curve by titrating a liquid obtained dissolving 1 mmol/L of a low molecular-weight dispersant in a tetrahydrofuran-water=3:2 (V/V) solution, with an acid or alkali aqueous solution.

Theoretically, when pKa of a low molecular-weight dispersant is 3 or more, 50% or more of anionic groups are in a non-dissociation state when contacted with a treating liquid having a pH of about 3. Therefore, water solubility of the low molecular-weight dispersant is remarkably decreased, and an aggregation reaction occurs. In other words, aggregation reactivity is improved. From this standpoint, it is preferred that the low molecular-weight dispersant has a carboxy acid group as an anionic group.

The hydrophobic group may have any of a hydrocarbon structure, a fluorocarbon structure, a silicone structure, and so on. In particular, the hydrophobic group is preferably a hydrocarbon group. The hydrophobic group may be any of a straight chain structure and a branched chain structure. The hydrophobic group may form a single chain structure or two or more chain structures. When two or more chain structures are formed, the dispersant may have different hydrophobic groups.

The hydrophobic group is preferably a hydrocarbon group of 2 to 24 carbon atoms, more preferably a hydrocarbon group of 4 to 24 carbon atoms, further preferably a hydrocarbon group of 6 to 20 carbon atoms.

Of the polymer dispersants in the invention, a hydrophilic polymer may be used as the water-soluble dispersant. Examples of a natural hydrophilic polymer include vegetable polymers such as gum Arabic, gum tragacanth, gum guar, gum karaya, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of a chemically modified hydrophilic polymer using a natural product as a raw material include cellulose polymers such as methyl cellulose, ethyl cellulose, hydroxyethyl cellulose, hydroxypropyl cellulose and carboxymethyl cellulose; starch polymers such as sodium starch glycolate and sodium starch phosphate; and seaweed polymers such as propylene glycol alginate.

Examples of a synthetic water-soluble polymer include vinyl polymers such as polyvinyl alcohol, polyvinyl pyrrolidone and polyvinyl methyl ether; acrylic resins such as polyacrylamide, polyacrylic acid or an alkali metal salt thereof, and water-soluble styrene acrylic resin; water-soluble styrene maleic acid resins; water-soluble vinylnaphthalene acrylic resins; water-soluble vinylnaphthalene maleic resins; polyvinyl pyrrolidone, polyvinyl alcohol, alkali metal salts of β-naphthalenesulfonic acid formalin condensate; and polymers having a salt of a cationic functional group such as quaternary ammonium or amino group at a side chain thereof.

Among these, a polymer containing a carboxy group is preferred from the standpoints of dispersion stability and aggregation properties of pigment. Polymers containing a carboxy group, such as acrylic resins such as water-soluble styrene acrylic resin; water-soluble styrene maleic acid resin; water-soluble vinylnaphthalene acrylic resin; and water-soluble vinylnaphthalene maleic acid resin are particularly preferred.

Among the polymer dispersants, as a water-insoluble dispersant, a polymer having both a hydrophilic moiety and a hydrophobic moiety may be used. Examples of such a polymer include styrene-(meth)acrylic acid copolymer, styrene-(meth)acrylic acid-(meth)acrylic acid ester copolymer, (meth)acrylic acid ester-(meth)acrylic acid copolymer, polyethylene glycol (meth)acrylate-(meth)acrylic acid copolymer and styrene-maleic acid copolymer.

The polymer dispersant in the invention preferably has a weight average molecular weight of from 3,000 to 200,000, more preferably from 5,000 to 100,000, further preferably from 5,000 to 80,000, and particularly preferably from 10,000 to 60,000.

Mixing mass ratio of a pigment to a dispersant (pigment:dispersant) is preferably in a range of from 1:0.06 to 1:3, more preferably in a range of from 1:0.125 to 1:2, and further preferably in a range of from 1:0.125 to 1:1.5.

When a dye is used as the coloring material in the invention, a material in which a water-insoluble carrier supports a dye can be used as water-insoluble colored particles. As the dye, conventional dyes may be used without particular limitation. For example, dyes described in JP-A No. 2001-115066, JP-A No. 2001-335714 and JP-A No. 2002-249677 can preferably be used in the invention. The carrier used is not particularly limited so long as it is insoluble or slightly soluble in water, and inorganic materials, organic materials and their composite materials can be used. Specifically, carriers described in, for example, JP-A No. 2001-181549 and JP-A No. 2007-169418 can preferably be used in the invention.

The carrier supporting a dye (water-insoluble colored particles) can be used as an aqueous dispersion using a dispersant. As the dispersant, any of the dispersants described hereinabove can be preferably used.

In the invention, the coloring material preferably contains a pigment and a dispersant, more preferably an organic pigment and a polymer dispersant, particularly preferably an organic pigment and a polymer dispersant having a carboxy group, from the viewpoints of scratch resistance and aggregation property.

From the viewpoint of aggregation property, the coloring material is preferably coated with a polymer dispersant having a carboxy group and insoluble in water.

In the invention, the self-dispersing polymer particles described later preferably have an acid value lower than the acid value of the polymer dispersant, from the viewpoint of aggregation property.

The coloring material has an average particle diameter of preferably from 10 nm to 200 nm, more preferably from 10 nm to 150 nm, and further preferably from 10 nm to 100 nm. When the average particle diameter is 200 nm or less, color reproducibility becomes better, and in the case of an inkjet method, droplet ejection properties become better. Furthermore, when the average particle diameter is 10 nm or more, light resistance becomes better.

Particle size distribution of the coloring material is not particularly limited, and may be any of wide particle size distribution and monodisperse particle size distribution. A mixture of two kinds or more of coloring materials having monodisperse particle size distribution may be used.

The average particle diameter and the particle diameter distribution of the polymer particles can be determined by measuring the volume average particle diameter by means of a dynamic light scattering method using a particle size distribution measuring apparatus NANOTRACKUPA-EX150 (trade name, manufactured by Nikkiso Co. Ltd.).

One or more coloring materials may be used alone or in combination.

From the viewpoint of image density, the content of the coloring material in the ink composition is preferably from 1 mass % to 25 mass %, more preferably from 2 mass % to 20 mass %, further preferably from 5 mass % to 20 mass %, particularly preferably from 5 mass % to 15 mass %.

(Polymer Particles)

The ink composition of the invention contains at least one polymer particle that have a minimum filming temperature (MFT$^{disp}$) of 60° C. or more when dispersed in water and that have a MFT 40° C. or more lower than the MFT$^{disp}$ when mixed with water and 25 mass % of the hydrophilic organic solvent based on a solid content of the polymer. The polymer particles capable of satisfying the relation MFT$^{disp}$-MFT$^{25\%\ aq} \geqq 40°$ C. can produce stable ejection performance and suppress blocking (sticking, etc.) of the recorded image.

The "MFT$^{disp}$" may be measured using a MFT meter manufactured by YOSHIMITU SEIKI K.K. Specifically, the MFT$^{disp}$ may be determined by a process that includes adjusting the concentration of an aqueous dispersion obtained by dispersing the desired polymer particles in water to 25 mass %, applying the resulting dispersion to a film (for example, 64 cm×18 cm) with a blade so as to form a 300 μm-thick coating (for example, 50 cm long×3 cm wide), heating the coating from the back side of the film to apply a temperature gradient of from 12° C. to 65° C. to the coating, and drying the coating for 4 hours under an environment at 20° C. and 22% RH, while measuring the boundary temperature (° C.) between the temperature where a white powder precipitate is produced and the temperature where a transparent film is formed.

The "$MFT^{25\% \ aq}$" may be measured using a similar process to that used for measuring the $MFT^{disp}$, except that a mixture (aqueous solution) of 25 mass % (solid mass) of the polymer particles, 6.25 mass % of the hydrophilic organic solvent (25 mass % based on the solid content of the polymer), which is used to form the ink composition, and 70 mass % of water is prepared and used in place of the aqueous dispersion. If the $MFT^{25\% \ aq}$ exceeds the upper limit of the meter, appropriate values between $MFT^{30\% \ aq}$ and $MFT^{50\% \ aq}$ may be measured, and then the $MFT^{25\% \ aq}$ may be estimated from the values.

In the invention, the polymer particles have an $MFT^{disp}$ of 60° C. or more. If the $MFT^{disp}$ of the polymer particles is less than 60° C., the recorded image may have stickiness, so that blocking (sticking, etc.) may occur when a sheet of paper or the like is placed on the image portion. In the invention, the $MFT^{disp}$ is preferably from 80 to 150° C. or more, and more preferably from 100 to 130° C. or more. When the $MFT^{disp}$ is less than 130° C., thermal fixation can be achieved with a relatively small amount of heat, which is preferred in order to reduce the power requirements of the fixation.

In the invention, the $MFT^{25\% \ aq}$ is in the range of at least 40° C. lower than the $MFT^{disp}$. If the temperature difference (° C.=$MFT^{disp}$-$MFT^{25\% \ aq}$) obtained by subtracting the $MFT^{25\% \ aq}$ from the $MFT^{disp}$ is less than 40° C., a relatively large amount of heat will be required for thermal fixation, while the scratch resistance of the recorded image may be reduced. In the invention, the $MFT^{25\% \ aq}$ is preferably in the range of at least 40° C. lower than the $MFT^{disp}$, and more preferably in the range of 45° C. to 60° C. lower than the $MFT^{disp}$. In the invention, a method for adjusting the temperature difference between the $MFT^{disp}$ and the $MFT^{25\% \ aq}$ to the above range may include appropriately selecting the type of the hydrophilic organic solvent to be contained in the ink composition or appropriately selecting the range of the amount of the hydrophilic organic solvent.

Within the foregoing, the $MFT^{disp}$ is preferably in the range of from 80 to 150° C., and the $MFT^{25\% \ aq}$ is preferably in the range of 40 to 60° C. lower than the $MFT^{disp}$.

Examples of the polymer particle in the invention include particles of a resin having an anionic group. Examples of the resin having an anionic group include thermosetting, or modified acrylic, epoxy, polyurethane, polyether, polyamide, unsaturated polyester, phenolic, silicone, and fluoro resins, polyvinyl type resins such as vinyl chloride, vinyl acetate, polyvinyl alcohol, and polyvinyl butyral resins, polyester resins such as alkyd resins and phthalic acid resins, amino type materials such as melamine resins, melamine formaldenyde resins, amino alkyd condensate resins, urea resin, and copolymers or mixtures thereof.

Among them, the anionic acrylic resin is obtained, for example, by polymerizing an acrylic monomer having an anionic group (anionic group-containing acrylic monomer) and, optionally, a monomer(s) copolymerizable with the anionic group-containing acrylic monomer in a solvent. Examples of the anionic group-containing acrylic monomer include acrylic monomers having at least one selected from the group consisting of a carboxy group, a sulfonic acid group, and a phosphonic group. Among them, acrylic monomers having a carboxy group (for example, acrylic acid, methacrylic acid, crotonic acid, ethacrylic acid, propyl acrylic acid, isopropyl acrylic acid, itaconic acid, and fluoric acid, etc.) are preferred, and acrylic acid or methacrylic acid are particularly preferred.

As the polymer particles in the invention, self-dispersing polymer particles are preferred and self-dispersing polymer particles having a carboxy group is more preferred, from the viewpoint of the ejection stability and the liquid stability (particularly, dispersion stability) in a case of using a coloring material (particularly, pigment), which will be described later. The self-dispersing polymer particles mean particles of a water-insoluble polymer which can form a dispersion state in an aqueous medium by means of a functional group (particularly, an acidic group or a salt thereof) of the polymer per se in the absence of other surfactant, and are water-insoluble polymer particles not containing an additional emulsifier.

The dispersed state may be an emulsified state where the water-insoluble polymer is dispersed in a liquid state in an aqueous medium (emulsion) or a state where the water-insoluble polymer is dispersed in a solid state in the aqueous medium (suspension).

The water-insoluble polymer in the invention is preferably such a water-insoluble polymer that can form a dispersed state where the water-insoluble polymer is dispersed in a solid state, from the viewpoints of the aggregation rate and the fixing property when it is prepared as a liquid composition.

The dispersed state of the self-dispersing polymer particles in the invention means such a state where stable presence of a dispersed state can be observed visually at 25° C. for at least one week after mixing and stirring a solution in which 30 g of a water-insoluble polymer is dissolved into 70 g of an organic solvent (for example, methyl ethyl ketone), a neutralizing agent capable of neutralizing salt-forming groups of the water-insoluble polymer to 100% (sodium hydroxide when the salt-forming groups are anionic, or acetic acid when the groups are cationic), and 200 g of water (apparatus: a stirrer equipped with a stirring blade, number of rotation: 200 rpm, 30 min, 25° C.), and then removing the organic solvent from the liquid mixture.

Further, the water-insoluble polymer means such a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The aqueous medium includes water and, if necessary, may include a hydrophilic organic solvent. In the invention, the aqueous medium is preferably composed of water and 0.2 mass % or less of a hydrophilic organic solvent based on the amount of water, more preferably consists of water.

The main chain skeleton of the water-insoluble polymer is not particularly limited and, for example, vinyl polymer or condensated type polymer (epoxy resin, polyester, polyurethane, polyamide, cellulose, polyether, polyurea, polyimide, polycarbonate, etc.) can be used. Among them, the vinyl polymer is particularly preferred.

Preferred examples of the vinyl polymer and the monomer used for the vinyl polymer include those described in JP-A Nos. 2001-181549 and 2002-88294. Further, vinyl polymers introduced with a dissociative group to a terminal end of a polymer chain by radical polymerization of a vinyl monomer using a chain transfer agent, a polymerization initiator, or an iniferter having a dissociative group (or substituent that can be induced to the dissociative group) or by ionic polymerization using a compound having a dissociative group (or substituent that can be induced to the dissociative group) to an initiator or a terminator can also be used.

Preferred examples of condensated type polymers and monomers used for the condensated type polymers include those described in JP-A No. 2001-247787.

The self-dispersing polymer particles in the invention preferably contain a water-insoluble polymer containing a hydrophilic constituent unit and a constituent unit derived from an aromatic group-containing monomer from the viewpoint of self-dispersibility.

The hydrophilic group-containing monomer in the invention is preferably a dissociative group-containing monomer and, preferably, a dissociative group-containing monomer having a dissociative group and an ethylenically unsaturated bond from the viewpoints of the self-dispersibility and the aggregation property.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinate, etc. Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl)itaconate. Specific examples of the unsaturated phosphoric acid monomer include vinylphosphonic acid, vinylphosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred and, acrylic acid and methacrylic acid are more preferred from the viewpoints of dispersed stability and ejection stability.

The self-dispersing polymer particles in the invention preferably contain a polymer having a carboxy group and contains, more preferably, a polymer having a carboxy group and an acid value (mgKOH/g) of from 25 to 100, from the viewpoint of the self-dispersibility and the aggregation rate when the ink composition containing the polymer particles is in contact with a treating liquid. The acid value is, more preferably, from 25 to 80 and, particularly preferably, from 30 to 65, from the viewpoints of the self-dispersibility and the aggregation rate when the ink composition containing the polymer particles is in contact with the treating liquid.

Particularly, when the acid value is 25 or more, the stability of the self-dispersibility may be more favorable, and when the acid value is 100 or less, the aggregation property may be improved.

The aromatic group-containing monomer is not particularly limited so long as it is a compound containing an aromatic group and a polymerizable group. The aromatic group may be either a group derived from an aromatic hydrocarbon or a group derived from an aromatic heterocycle. In the invention, the aromatic group is preferably an aromatic group derived from the aromatic hydrocarbon, from the viewpoint of the shape stability of particles in the aqueous medium.

The polymerizable group may be either a polycondensating polymerizable group or an addition polymerizing polymerizable group. In the invention, the polymerizable group is preferably an addition polymerizing polymerizable group, and more preferably, a group containing an ethylenically unsaturated bond from the viewpoint of shape stability of particles in the aqueous medium.

In the invention, the aromatic group-containing monomer preferably forms an acrylic resin containing a constituent unit derived from a (meth)acrylate monomer or preferably forms an acrylic resin containing a constituent unit derived from an aromatic group-containing (meth)acrylate monomer and is more preferably a monomer having an aromatic group derived from an aromatic hydrocarbon and having an ethylenic unsaturated bond. One or more aromatic group-containing monomers may be used alone or in combination.

Examples of the aromatic group-containing monomer include phenoxyethyl(meth)acrylate, benzyl(meth)acrylate, phenyl(meth)acrylate, and styrene type monomer. Among them, from the viewpoints of the balance between the hydrophilicity and the hydrophobicity of the polymer chain and the ink fixing property, an aromatic group-containing (meth)acrylate monomer is preferred, and at least one selected from the group consisting of phenoxyethyl(meth)acrylate, benzyl(meth)acrylate, and phenyl(meth)acrylate is more preferably and, phenoxyethyl(meth)acrylate and benzyl(meth)acrylate are still more preferred. "(Meth)acrylate" means acrylate or methacrylate, The self-dispersing polymer particles in the invention preferably contain a constituent unit derived from the aromatic group-containing (meth)acrylate monomer and the content thereof is, preferably, from 10 mass % to 95 mass %. When the content of the aromatic group-containing (meth)acrylate monomer is from 10 mass % to 95 mass %, the stability of the self-emulsified or dispersed state is improved and, further, increase in the viscosity of an ink can be suppressed.

In the invention, the content of the aromatic group-containing (meth)acrylate monomer is, more preferably, from 15 mass % to 90 mass %, further preferably, from 15 mass % to 80 mass % and, particularly preferably, from 25 mass % to 70 mass % from the viewpoint of the stability of the self-dispersed state, stabilization for the shape of the particles in the aqueous medium due to hydrophobic inter-action between aromatic rings to each other, and lowering of the amount of the water-soluble component due to appropriate hydrophobic property of the particles.

The self-dispersing polymer particles in the invention can be formed by using, for example, a constituent unit derived from an aromatic group-containing monomer and a constituent unit derived from a dissociative group-containing monomer. The polymer particles may further contain other constituent units if necessary.

Any monomer copolymerizable with the aromatic group-containing monomer or the dissociative group-containing monomer may be used to form the other constituent units. In particular, such a monomer is preferably an alkyl group-containing monomer from the viewpoint of polymer skeleton flexibility or easiness of glass transition temperature (Tg) control.

Examples of the alkyl group-containing monomer include (meth)acrylic ester monomers such as alkyl(meth)acrylates such as methyl(meth)acrylate, ethyl(meth)acrylate, isopropyl(meth)acrylate, n-propyl(meth)acrylate, n-butyl(meth)acrylate, isobutyl(meth)acrylate, tert-butyl(meth)acrylate, hexyl(meth)acrylate, and ethylhexyl(meth)acrylate, hydroxyl group-containing ethylenic unsaturated monomers such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl(meth)acrylate, and dialkylaminoalkyl(meth)acrylate such as dimethylaminoethyl(meth)acrylate; and (meth)acrylamide monomers such as (meth)acrylamides such as N-hydroxyalkyl(meth)acrylamides such as N-hydroxymethyl(meth) acrylamide, N-hydroxyethyl(meth)acrylamide, and N-hydroxybutyl(meth)acrylamide, and N-alkoxyalkyl(meth) acrylamides such as N-methoxymethyl(meth)acrylamide, N-ethoxymethyl(meth)acrylamide, N-(n-, iso)butoxymethyl (meth)acrylamide, N-methoxyethyl(meth)acrylamide, N-ethoxyethyl(meth)acrylamide, and N-(n-, iso)butoxyethyl (meth)acrylamide.

A weight-average molecular weight of the water-insoluble polymer that is used in the self-dispersing polymer particles in the invention is, preferably, from 3,000 to 200,000 and, more preferably, from 5,000 to 150,000 and, further preferably, from 10,000 to 100,000. The amount of the water-soluble component can be suppressed effectively by defining the weight average molecular weight to 3,000 or more. Further, the self-dispersed stability can be increased by defining the weight average molecular weight to 200,000 or less.

The weight average molecular weight was measured by gel permeation chromatography (GPC). In GPC, HLC-8020GPC (trade name, manufactured by Tosoh Corporation) was used, and 3 pieces of TSKgel Super Multipore HZ-H connected in series (manufactured by Tosoh Corporation, 4.6 mm ID×15 cm) were used as the column, and THF (tetrahydrofuran) was used as an eluate. Further, the measurement was performed by using an IR detector under the conditions at a sample concentration of 0.35 mass %, a flow rate of 0.35 mL/min, a sample ejection amount of 10 μL, and a measuring temperature of 40° C. A calibration curve was prepared based on eight samples of "standard sample TSK: standard, polystyrene" of "F-40", "F-20", "F-4", "F-1", "A-5000", "A-2500", "A-1000", and "n-propylbenzene" manufactured by Tosoh Corporation.

The water-insoluble polymer used for the self-dispersing polymer particle in the invention preferably contains a structural unit derived from an aromatic group-containing (meth) acrylate monomer (preferably, a structural unit derived from phenoxyethyl(meth)acrylate and/or a structural unit derived from benzyl(meth)acrylate) at from 15 mass % to 80 mass % as the copolymerization ratio based on the entire mass of the self-dispersing polymer particles from the viewpoint of controlling the hydrophilicity and hydrophobicity of the polymer.

Further, the water-insoluble polymer preferably contains a constituent unit derived from an aromatic group-containing (meth)acrylate monomer at from 15 mass % to 80 mass % as the copolymerization ratio, a constituent unit derived from a carboxy group-containing monomer, and a constituent unit derived from an alkyl group-containing monomer (preferably, a constituent unit derived from (meth)acrylic acid alkyl ester). The water-insoluble polymer more preferably contains a structural unit derived from phenoxyethyl(meth)acrylate and/or a structural unit derived from benzyl(meth)acrylate at from 15 to 80 mass % as the copolymerization ratio, a constituent unit derived from a carboxy group-containing monomer, and a constituent unit derived from an alkyl group-containing monomer (preferably, a structural unit derived from an ester of alkyl having 1 to 4 carbon atoms and (meth) acrylic acid). Further, the water-insoluble polymer has preferably an acid value of from 25 to 100 and a weight average molecular weight of from 3,000 to 200,000 and, more preferably, an acid value of from 25 to 95 and a weight average molecular weight of from 5,000 to 150,000, from the viewpoints of controlling the hydrophilicity and hydrophobicity of the polymer.

As specific examples of the water-insoluble polymer that is used in the self-dispersing polymer particle exemplary compounds B-01 to B-19 are shown below but the invention is not limited to them. Numerical values described in each parenthesis represent the mass ratio of the copolymer components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/ methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/ acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/ acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/ acrylic acid copolymer (50/5/20/25)

B-14: styrene/butyl acrylate/acrylic acid copolymer (62/ 35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

The method of producing a water-insoluble polymer that is used in the self-dispersing polymer particle in the invention is not particularly limited. Examples of the method of producing the water-insoluble polymer include a method of performing emulsion polymerization under the presence of a polymerizable surfactant thereby covalently-bonding the surfactant and the water-insoluble polymer and a method of copolymerizing a monomer mixture containing the hydrophilic group-containing monomer and the aromatic group-containing monomer by a known polymerization method such as a solution polymerization method or a bulk polymerization method. Among the polymerization methods described above, the solution polymerization method is preferred and a solution polymerization method of using an organic solvent is more preferred from the viewpoint of aggregation rate and the stability of droplet ejection when contained as an ink composition.

From the viewpoint of the aggregation rate, it is preferred that the self-dispersing polymer particles in the invention contain a polymer synthesized in an organic solvent, and the polymer has a carboxy group (with acid value preferably from 20 to 100), in which the carboxy groups of the polymer are partially or entirely neutralized and the polymer is prepared as a polymer dispersion in a continuous phase of water. That is, the self-dispersing polymer particle in the invention is prepared by a method including a step of synthesizing the polymer in the organic solvent and a dispersed step of forming an aqueous dispersion in which at least a portion of the carboxy groups of the polymer is neutralized.

The dispersed step preferably includes the following step (1) and step (2).

Step (1): step of stirring a mixture containing a polymer (water-insoluble polymer), an organic solvent, a neutralizing agent, and an aqueous medium, Step (2): step of removing the organic solvent from the mixture.

The step (1) is preferably a treatment that includes at first dissolving the polymer (water-insoluble polymer) in the organic solvent and then gradually adding the neutralizing agent and the aqueous medium, and mixing and stirring them to obtain a dispersion. By adding the neutralizing agent and the aqueous medium to the solution of the water-insoluble polymer dissolved in the organic solvent, self-dispersing polymer particles having a particle size that enables higher storage stability can be obtained without requiring strong sharing force.

The stirring method for the mixture is not particularly limited and a mixing and stirring apparatus that is used generally can be used, and if necessary, a disperser such as a ultrasonic disperser or a high pressure homogenizer can be used.

Preferable examples of the organic solvent include alcohol type solvents, ketone type solvents and ether type solvents.

Examples of the alcohol type solvent include isopropyl alcohol, n-butanol, t-butanol, and ethanol. Examples of the ketone type solvent include acetone, methyl ethyl ketone, diethyl ketone, and methyl isobutyl ketone. Examples of the ether type solvent include dibutyl ether and dioxane. Among the solvents, the ketone type solvent such as methyl ethyl ketone and the alcohol type solvent such as propyl alcohol are preferred. Further, with an aim of moderating the change of polarity at the phase transfer from an oil system to an aqueous system, combined use of isopropyl alcohol and methyl ethyl ketone is also preferred. By the combined use of the solvents, self-dispersing polymer particles of fine particle size with no aggregation settling or fusion between particles to each other and having high dispersed stability may be obtained.

The neutralizing agent is used to partially or entirely neutralize the dissociative groups so that the self-dispersing polymer can form a stable emulsified or dispersed state in water. In the case where the self-dispersing polymer of the invention has an anionic dissociative group (for example, a carboxy group) as the dissociative group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethylethanolamine, 2-diethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles of the invention into water.

The basic compound is used preferably in an amount of from 5 mol % to 120 mol % and, more preferably, by from 10 mol % to 110 mol % and, further preferably, by from 15 mol % to 100 mol % relative to 100 mol % of the dissociative groups. When the basic compound is used in an amount of 1 5mol % or more, the effect of stabilizing the dispersion of the particles in water may be obtained and when the basic compound is in an amount of 100% or less, the effect of decreasing the water-soluble component may be provided.

In the step (2), an aqueous dispersion of the self-dispersing polymer particles can be obtained by phase transfer to the aqueous phase by distilling off the organic solvent from the dispersion obtained in the step (1) by a common method such as distillation under a reduced pressure. In the obtained aqueous dispersion, the organic solvent has been substantially removed and the amount of the organic solvent is preferably 0.2 mass % or less and, more preferably, 0.1 mass % or less.

The average particle diameter of the polymer particles (particularly, self-dispersing polymer particles) is, preferably, in a range from 10 nm to 400 nm, more preferably in a range from 10 nm to 200 nm, further preferably, in a range from 10 nm to 100 nm and, particularly preferably, in a range from 10 nm to 50 nm as the volume average particle diameter. The production adaptability may be improved when the average particle diameter is 10 nm or more. The storage stability may be improved when the average particle diameter is 400 nm or less. The particle diameter distribution of the polymer particles is not particularly limited and it may be either a wide particle diameter distribution or a monodispersed particle diameter distribution. Further, two or more types of water-insoluble particles may be used in admixture.

The average particle diameter and the particle diameter distribution of the polymer particles can be determined by measuring the volume average particle diameter by means of a dynamic light scattering method using a particle size distribution measuring apparatus NANOTRACKUPA-EX150 (trade name, manufactured by Nikkiso Co., Ltd.).

The content of the polymer particles (particularly, self-dispersing polymer particles) in the liquid composition is, preferably, from 1 mass % to 30 mass % and, more preferably, from 5 mass % to 15 mass % relative to the liquid composition, from the viewpoint of the glossiness of an image.

The polymer particles (particularly, self-dispersing polymer particles) can be used alone or two or more kinds of the polymer particles can be used in admixture.

Hydrophilic Organic Solvent

The ink composition contains water as a solvent and at least one hydrophilic organic solvent. Since the ink composition contains the polymer particles together with the hydrophilic organic solvent, the MTF of the polymer particles in the ink composition can be kept at a relatively low level, so that the ejection performance and so on can be maintained well.

The hydrophilic organic solvent to form the ink composition is preferably an (alkyleneoxy)alcohol or an (alkyleneoxy)alkyl ether in order that the $MFT^{25\% \, aq}$ may be lowered so that the temperature difference between the $MFT^{disp}$ and the $MFT^{25\% \, aq}$ ($MFT^{disp}$-$MFT^{25\% \, aq}$) may be 40° C. or more. For the same purpose, the ink composition preferably contains two or more hydrophilic organic solvents, and when it contains two or more hydrophilic organic solvents, at least one of them is preferably an (alkyleneoxy)alcohol, and in particular, the two or more hydrophilic organic solvents preferably include at least one (alkyleneoxy)alcohol and at least one (alkyleneoxy)alkyl ether.

The (alkyleneoxy)alcohol is preferably a (propyleneoxy) alcohol. Examples of the (propyleneoxy)alcohol include Sannix GP250 and Sannix GP400 (trade names, each manufactured by Sanyo Chemical Industries, Ltd.).

The (alkyleneoxy)alkyl ether is preferably an (ethyleneoxy)alkyl ether having an alkyl moiety of 1 to 4 carbon atoms or a (propyleneoxy)alkyl ether having an alkyl moiety of 1 to 4 carbon atoms. Examples of the (alkyleneoxy)alkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, triethylene glycol monoethyl ether, triethylene glycol monomethyl ether, and ethylene glycol monophenyl ether.

In the invention, the polymer particles are preferably self-dispersing polymer particles, and the hydrophilic organic solvent is preferably a (propyleneoxy)alcohol and an (ethyleneoxy)alkyl ether (with an alkyl moiety of 1 to 4 carbon atoms) and/or a (propyleneoxy)alkyl ether (with an alkyl moiety of 1 to 4 carbon atoms). More preferably, the polymer particles are self-dispersing polymer particles containing a water-insoluble polymer having a hydrophilic constituent unit and a constituent unit derived from an aromatic group-containing monomer, and the hydrophilic organic solvent is a (propyleneoxy)alcohol and an (ethyleneoxy)alkyl ether (with an alkyl moiety of 1 to 4 carbon atoms) and/or a (propyleneoxy)alkyl ether (with an alkyl moiety of 1 to 4 carbon atoms).

In addition to the hydrophilic organic solvent, if necessary, any other organic solvent may be added for the purpose of preventing dryness, enhancing penetration, controlling viscosity, or the like.

A certain organic solvent used as an anti-drying agent can be effectively prevent nozzle clogging, which could otherwise be caused by the ink dried in the ink discharge port in the process of discharging the ink composition by ink-jet method for image recording.

For the prevention of drying, a hydrophilic organic solvent having a vapor pressure lower than that of water is preferably used. Examples of hydrophilic organic solvents suitable for the prevention of drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane, heterocyclic compounds such as 2-pyrrolidone, N-methyl-2-pyrrolidone, 1,3-dimethyl-2-imidazolidinone, and N-ethylmorpholine, sulfur-containing compounds such as sulfolane, dimethylsulfoxide and 3-sulfolene, polyfunctional compounds such as diacetone alcohol and diethanolamine, and urea derivatives. In particular, polyhydric alcohols such as glycerin and diethylene glycol are preferred.

In order to enhance the penetration, an organic solvent may be used for better penetration of the ink composition into recording media. Examples of organic solvents suitable for penetration enhancement include alcohols such as ethanol, isopropanol, butanol, and 1,2-hexanediol, sodium lauryl sulfate, sodium oleate, and nonionic surfactants.

Besides the above, a hydrophilic organic solvent may also be used to control viscosity. Examples of hydrophilic organic solvents that may be used to control viscosity include alcohols (e.g., methanol, ethanol and propanol), amines (e.g., ethanolamine, diethanolamine, triethanolamine, ethylenediamine, and diethylenetriamine), and other polar solvents (e.g., formamide, N,N-dimethylformamide, N,N-dimethylacetamide, dimethylsulfoxide, sulfolane, 2-pyrrolidone, acetonitrile, and acetone).

(Water)

The ink composition used in the invention includes water. There is no limitation for the content of water. The liquid composition may preferably contains water in an amount of 10 to 99 % by mass, more preferably from 30% to 80 % by mass, and still more preferably 50% to 70% by mass.

(Other Additives)

The ink composition may optionally contain other additives, in addition to the components described above. Examples of other additives that may be used in the invention include conventional additives such as a color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersed stabilizer, anti-rust agent and chelating agent. Those various additives may directly be added after preparation of the ink composition, or may be added at the time of preparation of the ink composition.

The ultraviolet absorber can improve the image storage stability. Examples of ultraviolet absorbers that may be used include the benzotriazole compounds described in JP-A Nos. 58-185677, 61-190537, 02-782, 05-197075, and 09-34057, the benzophenone compounds described in JP-A Nos. 46-2784 and 05-194483 and U.S. Pat. No. 3,214,463, the cinnamic acid derivatives described in Japanese Patent Application Publication (JP-B) Nos. 48-30492 and 56-21141 and JP-A No. 10-88106, the triazine compounds described in JP-A Nos. 04-298503, 08-53427, 08-239368, and 10-182621, and Japanese Patent Application National Publication (Laid-Open) No. 08-501291, the compounds described in Research Disclosure No. 24239, and compounds capable of absorbing ultraviolet light and emitting fluorescence, so-called fluorescent whitening agents, such as stilbene compounds and benzoxazole compounds.

The color fading inhibitor can improve the image storage stability. Various organic and metal-complex color fading inhibitors may be used. Organic color fading inhibitors include hydroquinones, alkoxyphenols, dialkoxyphenols, phenols, anilines, amines, indanes, chromans, alkoxyanilines, and heterocyclic compounds. Metal-complex color fading inhibitors include nickel complexes and zinc complexes. More specifically, examples of color fading inhibitors that may be used include the compounds described in Articles I to J of Section VII of Search Disclosure No. 17643, Search Disclosure No. 15162, left column of page 650 of Search Disclosure No. 18716, page 527 of Search Disclosure No. 36544, page 872 of Search Disclosure No. 307105, and the patent literature cited in Search Disclosure No. 15162, and the compounds represented by the formulae for the typical compounds and included in the compound examples, in pages 127 to 137 of JP-A No. 62-215272.

Examples of the mildew-proofing agent include sodium dehydroacetate, sodium benzoate, pyridinethione-1-oxide sodium salt, ethyl p-hydroxybenzoate, 1,2-benzisothiazol-3-one, and salts thereof. The ink composition preferably contains 0.02 mass % to 1.00 mass % of any of these agents.

A neutralizing agent (an organic base, an inorganic alkali) may be used as the pH regulator. In order to improve the storage stability of the ink composition, the pH regulator is preferably added so that the ink composition can have a pH of from 6 to 10, more preferably from 7 to 10.

Examples of the surface tension regulator include nonionic surfactants, cationic surfactants, anionic surfactants, and betaine type surfactants.

For smooth ejection in ink-jet methods, the amount of addition of the surface tension regulator is preferably such that the surface tension of the ink composition can be adjusted in the range of from 20 to 60 mN/m, more preferably from 20 to 45 mN/m, further preferably from 25 to 40 mN/m. When the ink is applied by methods other than ink-jet methods, the amount of addition of the surface tension regulator is preferably such that the surface tension of the ink composition can be adjusted in the range of from 20 to 60 mN/m, more preferably from 30 to 50 mN/m.

The surface tension of the ink composition may be measured by a plate method using Automatic Surface Tensiometer CBVP-Z (trade name, manufactured by Kyowa Interface Science Co., LTD.) under 25° C. conditions.

Preferred examples of the surfactant include hydrocarbon anionic surfactants such as fatty acid salts, alkyl sulfuric acid ester salts, alkyl benzenesulfonates, alkyl naphthalenesulfonates, dialkyl sulfosuccinates, alkyl phosphonic acid ester salts, naphthalenesulfonic acid-formalin condensates, and polyoxyethylene alkyl sulfuric acid ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerine fatty acid esters, and oxyethylene-oxypropylene block copolymers. Acetylene polyoxyethylene oxide surfactants SURFYNOLs (trade name, manufactured by Air Products & Chemicals, Inc.) are also preferably used. Amine oxide type amphoteric surfactants such as N,N-dimethyl-N-alkylamine oxide are also preferred.

In addition, the surfactants listed in pages 37 to 38 of JP-A No. 59-157636 and Research Disclosure No. 308119 (1989) may also be used.

Fluorocarbon (alkyl fluoride type) surfactants or silicone surfactants as described in JP-A Nos. 2003-322926, 2004-325707 and 2004-309806 may be used to improve scratch resistance.

The surface tension regulator may also be used as a defoamer, and fluoride compounds, silicone compounds, and chelating agents such as EDTA may also be used.

When the ink composition is ejected and applied by ink-jet methods, the viscosity of the ink composition is preferably in the range of from 1 mPa·s to 30 mPa·s, more preferably from 1 mPa·s to 20 mPa·s, further preferably from 2 mPa·s to 15 mPa·s, particularly preferably from 2 mPa·s to 10 mPa·s, from the viewpoint of ejection stability and the aggregation rate upon contact between the ink composition and the treating liquid. When the ink composition is applied by methods other than ink-jet methods, the viscosity of the ink composition is preferably in the range of from 1 mPa·s to 40 mPa·s, more preferably from 5 mPa·s to 20 mPa·s.

For example, the viscosity of the ink composition may be measured using a Brookfield viscometer.

(Ink Set)

The ink set of the invention includes the ink composition of the invention described above and a treating liquid capable of forming an aggregate upon contact with the ink composition.

The ink composition has been described in detail above.

According to the invention, the particulate resin component used to form the ink composition includes polymer particles capable of changing in such a way as to satisfy the relation $MFT^{disp} - MFT^{25\% \, aq} \geq 40°$ C. wherein $MFT^{disp}$ is the MFT of the polymer particles in an aqueous dispersion, and $MFT^{25\% \, aq}$ is the MFT of the polymer particles in an aqueous solution containing the hydrophilic organic solvent. Therefore, the minimum filming temperature (MFT) of the polymer particles in the ink composition containing the organic solvent is kept at a relatively low level, but after droplets of the ink composition are ejected and deposited on a recording medium, the ink solvent is absorbed into the recording medium and undergoes other processes such as time course and drying so that the ink solvent is released from the ink, which increases the MFT of the polymer particles. According to the invention, therefore, even when polymer particles having a relatively low MFT and a relatively low glass transition point (Tg) are used so that fixing performance such as scratch resistance can be ensured with relatively low thermal energy, images less likely to cause blocking can be obtained.

(Treating Liquid)

In the invention, the treating liquid is prepared so as to be capable of forming an aggregate upon contact with the ink composition. Specifically, the treating liquid preferably contains at least an aggregating component capable of aggregating the dispersed particles in the ink composition, such as the coloring material particles (such as a pigment) and forming an aggregate. If necessary, the treating liquid may be prepared using any other component. The use of the ink composition in combination with the treating liquid allows faster ink-jet recording and also allows the formation of images with high density and resolution and high drawing quality (such as reproducibility of fine lines or portions) even in high-speed recording.

(Aggregating Component)

The treating liquid may contain at least one aggregating component capable of forming an aggregate upon contact with the ink composition. Mixing the treating liquid with the ink composition ejected by ink-jet method promotes aggregation of the pigment or the like, which is stably dispersed in the ink composition.

Examples of the treating liquid include a liquid capable of forming an aggregate at the liquid composition by changing the pH of the liquid composition. The pH of the treating liquid (at 25° C.) is, preferably, from 1 to 6, more preferably, from 2 to 5 and, further preferably, from 3 to 5, from the viewpoint of the aggregation rate of the liquid composition. In this case, the pH of the liquid composition (at 25° C.) used in the ejection step is, preferably, 7.5 or higher (more preferably, 8 or higher).

Among all, in the invention, it is preferred that the pH of the liquid composition (at 25° C.) is 7.5 or higher and the pH of the treating liquid (at 25° C.) is preferably from 3 to 5, from the viewpoint of the image density, the resolution and increase in the ink-jet recording speed.

The aggregating component can be used alone or two or more of components can be used in admixture.

The treating liquid may be prepared using at least one acidic compound as the aggregating component. Acidic compounds that may be used include compounds having a phosphate group, a phosphonate group, a phosphinate group, a sulfate group, a sulfonate group, a sulfinate group, or a carboxy group, or salts thereof (such as polyvalent metal salts). Particularly, in view of the aggregation rate of the ink composition, compounds having a phosphate group or a carboxy group are more preferred, and compounds having a carboxy group is further preferred.

The carboxy group-containing compound is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, ortho-phosphoric acid, pyrrolidone carboxylic acid, pyrone carboxylic acid, pyrrole carboxylic acid, furancarboxylic acid, pyridinecarboxylic acid, coumaric acid, thiophencarboxylic acid, nicotinic acid, derivatives of these compounds, or salts thereof (such as polyvalent metal salts). One or more of these compounds may be used alone or in any combination.

In the invention, the treating liquid may include an aqueous solvent (such as water) in addition to the acidic compound.

From the viewpoint of the aggregating effect, the content of the acidic compound in the treating liquid is preferably from 5 mass % to 95 mass %, more preferably from 10 mass % to 80 mass %, further preferably from 15 mass % to 50 mass %, particularly preferably from 18 mass % to 30 mass %, based on the total mass of the treating liquid.

Preferred examples of the treating liquid that may improve the high speed aggregation property include a treating liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salt or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

From the viewpoint of the aggregating effect, the content of the metal salt in the treating liquid is preferably from 1 mass % to 10 mass %, more preferably from 1.5 mass % to 7 mass %, further preferably rom 2 mass % to 6 mass %.

The treating liquid may be prepared using at least one cationic organic compound as the aggregating component. Examples of the cationic organic compound include cationic polymers such as poly(vinylpyridine) salts, polyalkylaminoethyl acrylate, polyaklylaminoethyl methacrylate, poly(vinylimidazole), polyethyleneimine, polybiguanide, polyguanide, and polyallyamine, and derivatives thereof.

From the viewpoint of the viscosity of the treating liquid, the weight average molecular weight of the cationic polymer is preferably as low as possible. When the treating liquid is applied to the recording medium by ink-jet method, the weight average molecular weight is preferably in the range of from 1,000 to 500,000, more preferably from 1,500 to 200,000, further preferably from 2,000 to 100,000. A weight average molecular weight of 1,000 or more is advantageous from the viewpoint of the aggregation rate, and a weight average molecular weight of 500,000 or less is advantageous from the viewpoint of ejection reliability. However, this does not always apply to cases where the treating liquid is applied to the recording medium by methods other than ink-jet methods.

The cationic organic compound is also preferably a primary, secondary or tertiary amine salt type compound. Examples of such an amine salt type compound include cationic compounds such as hydrochlorides or acetates of compounds (e.g., laurylamine, coconut amine, stearylamine, and rosin amine), quaternary ammonium salt type compounds (e.g., lauryltrimethylammonium chloride, cetyltrimethylammonium chloride, lauryldimethylbenzylammonium chloride, benzyltributylammonium chloride, and benzalkonium chloride), pyridinium salt type compounds (e.g., cetylpyridinium chloride and cetylpyridinium bromide), imidazoline type cationic compounds (e.g., 2-heptadecenyl-hydroxyethylimidazoline), higher alkylamine ethylene oxide adducts (e.g., dihydroxyethylstearylamine); and amphoteric surfactants capable of being cationic in the desired pH range, such as amino acid type amphoteric surfactants, R—NH—$CH_2CH_2$—COOH type compounds, carboxylate type amphoteric surfactants (e.g., stearyl dimethyl betaine and lauryl dihydroxyethyl betaine), and sulfate type, sulfonate type, or phosphate type amphoteric surfactants.

In particular, divalent or polyvalent cationic organic compounds are preferred.

From the viewpoint of the aggregating effect, the content of the cationic organic compound in the treating liquid is preferably from 1 to 50 mass %, more preferably from 2 to 30 mass %.

Above all, the aggregating component is preferably a divalent or polyvalent carboxylic acid or a divalent or polyvalent cationic organic compound from the viewpoint of the aggregation property and the scratch resistance of images.

From the viewpoint of the aggregation rate of the ink composition, the viscosity of the treating liquid is preferably in the range of from 1 mPa·s to 30 mPa·s, more preferably from 1 mPa·s to 20 mPa·s, further preferably from 2 mPa·s to 15 mPa·s, particularly preferably from 2 mPa·s to 10 mPa·s. The viscosity may be measured using VISCOMETER TV-22 (trade name, manufactured by TOKI SANGYO CO., LTD.) under 20° C. conditions.

From the viewpoint of the aggregation rate of the ink composition, the surface tension of the treating liquid is preferably from 20 mN/m to 60 mN/m, more preferably from 20 mN/m to 45 mN/m, further preferably from 25 mN/m to 40 mN/m. The surface tension may be measured using Automatic Surface Tensiometer CBVP-Z (trade name, manufactured by Kyowa Interface Science Co., LTD.) under 25° C. conditions.

(Other Components)

In the invention, the treating liquid may generally contain a water-soluble organic solvent in addition to the aggregating component. The treating liquid may also be prepared using other various additives, as long as the effects of the invention are not impaired. The details of the water-soluble organic solvent may be the same as those described above for the ink composition.

Examples of the other additives include conventional additives such as anti-drying agent (moistening agent), a color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersion stabilizer, anti-rust agent, and chelating agent. The examples listed above for the other additives contained in the ink composition may also be used.

<Ink-jet Recording Method>

The ink-jet recording method of the invention includes at least the steps of: applying the ink composition of the invention to a recording medium by an ink-jet method; and applying, to the recording medium, a treating liquid capable of forming an aggregate upon contact with the ink composition. If necessary, the ink-jet recording method of the invention may further include any other steps.

According to the invention, the particulate resin component used to form the ink composition for visible image recording includes polymer particles capable of changing in such a way as to satisfy the relation $MFT^{disp}-MFT^{25\% \, aq} \geq 40°$ C., wherein $MFT^{disp}$ is the MFT of the polymer particles in an aqueous dispersion, and $MFT^{25\% \, aq}$ is the MFT of the polymer particles in an aqueous solution containing the hydrophilic organic solvent. Therefore, the minimum filming temperature (MFT) of the polymer particles in the ink composition containing the organic solvent is kept at a relatively low level, but after droplets of the ink composition is ejected and deposited on a recording medium, the ink solvent is absorbed into the recording medium and undergoes other processes such as time course and drying so that the ink solvent is released from the ink, which increases the MFT of the polymer particles. According to the invention, therefore, images less likely to cause blocking can be obtained, while fixing performance such as scratch resistance can be ensured with relatively low thermal energy.

A description is given below of each step of the ink-jet recording method of the invention.

<Ink Applying Step>

The ink applying step is the step of applying the ink composition of the invention to a recording medium by an ink-jet method. In this step, the ink composition may be selectively applied to the recording medium so that the desired visible image can be formed. Each component of the ink composition of the invention and exemplary embodiments have been described in detail above.

Image recording utilizing the ink-jet method can be performed, specifically, by supplying energy thereby ejecting a liquid composition to a desired recording medium, that is, plain paper, resin-coated paper, paper used exclusively for ink-jet recording described, for example, in JP-A Nos. 8-169172, 8-27693, 2-276670, 7-276789, 9-323475, 62-238783, 10-153989, 10-217473, 10-235995, 10-337947, 10-217597, and 10-337947, films, common use paper for electrophotography, clothes, glass, metals, ceramics, etc. As the ink-jet recording method suitable to the invention, a method described in JP-A No. 2003-306623, in columns (0093) to (0105) may be applicable.

The ink-jet method is not particularly limited and may be of any known system, for example, a charge control system of ejecting an ink utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink utilizing a radiation pressure, and a thermal ink-jet system of heating an ink to form bubbles and utilizing the resultant pressure (BUBBLEJET (registered trade mark)). As the ink-jet method, an ink-jet method described in JP-A No. 54-59936 of causing abrupt volume change to an ink that undergoes the effect of thermal energy, and ejecting the ink from a nozzle by an operation force due to the change of state can be utilized effectively.

Examples of the ink-jet method include a system of injecting a number of ink droplets of low concentration, a so-called "photo-ink" each in a small volume, a system of improving an image quality using plural inks of a substantially identical hue and of different concentrations, and a system of using a colorless transparent ink.

The ink-jet head used in the ink-jet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal ink-jet type, BUBBLEJET (registered trade mark) type, etc.), an electrostatic attraction system (for example, electric field control type, and slit jet type, etc.), and an electric discharge system (for example, spark jet type, etc.) and any of the ejection systems may be used.

Ink nozzles, etc. used for recording by the ink-jet method are not particularly limited but can be selected properly depending on the purpose.

Examples of ink-jet recording methods are shown below.

Ink-jet recording methods include: (1) a so-called electrostatic suction method that includes applying a strong electric field between accelerating electrodes placed at nozzles and placed in front of the nozzles, continuously ejecting ink droplets from nozzles, and applying printing information signals to deflecting electrodes while the ink droplets pass between the deflecting electrodes so that an image can be recorded with the ink droplets flying toward and being fixed on a recording medium, or ejecting ink droplets from the nozzles to a recording medium according to printing information signals without deflecting the ink droplets so that an image can be fixed and recorded on the recording medium; (2) a method that includes applying a pressure from a small pump to an ink liquid, while mechanically oscillating inkjet nozzles by means of a crystal resonator or the like, so that ink droplets are forced to be ejected from the nozzles, wherein the ink droplets ejected from the nozzles are electrostatically charged at the same time, and applying printing information signals to deflecting electrodes while the ink droplets pass between the deflecting electrodes so that an image can be recorded with the ink droplets flying toward and being fixed on a recording medium; (3) a method (piezo) that includes applying a pressure and printing information signals at the same time from a piezoelectric device to an ink liquid to eject ink droplets from nozzles to a recording medium, so that an image is recorded on the recording medium; and (4) a method (Bubble-Jet (registered trademark)) that includes heating an ink liquid with micro-electrodes according to printing information signals to form ink bubbles and expanding the bubbles to eject the ink liquid from nozzles to a recording medium, so that an image is recorded on the recording medium.

Examples of the ink-jet head include an ink-jet head of a shuttle system in which a short serial head is used and recording is performed while allowing the head to scan in the lateral direction of a recording medium, and an ink jet head of a line system in which a line head in which recording elements are arranged corresponding to the entire region for one side of a recording medium is used. In the line system, an image can be recorded over the entire surface of the recording medium by allowing the recording medium to be scanned in the direction orthogonal with the direction of arranging the recording elements, in which a transportation system such as a carriage by which the short head moves for scanning is not necessary. Further, since complicate scanning control for the movement of the carriage and the recording medium is not necessary and only the recording medium is moved, higher recording speed can be attained as compared with the shuttle system. While the ink-jet recording method of the invention is applicable to any one of them, the effect of improving the ejection accuracy and the scratch resistance of the image is generally remarkable when the ink-jet recording method is applied to the line system without performing dummy jetting.

The ink applying step according to the invention may be performed in the line system. In this case, a single ink composition or two or more ink compositions may be used. When two or more ink compositions are used, the time interval between preceding ejection (deposition) of an ink composition (the n-th color (n≧1), for example, the second color) and immediately succeeding ejection (deposition) of another ink composition (the (n+1)-th color, for example, the third color) may be set to one second or less, in which good recording can be performed. According to the invention, at an ejection interval of one second or less in the line system, images having good scratch resistance and being less likely to cause blocking can be obtained by high speed recording at a speed equal to or higher than the conventional one, while running or color mixing is prevented, which would otherwise be caused by interference between ink droplets. In addition, images with a high level of hue quality and drawing quality (reproducibility of fine lines and portions in the images) can also be obtained.

In order to form high definition images, the amount of an ink droplet ejected from an ink-jet head is preferably from 0.5 pl to 6 pl (picoliters), more preferably from 1 pl to 5 pl, further preferably from 2 pl to 4 pl.

<Treating Liquid Applying Step>

In the treating liquid applying step, the treating liquid capable of forming an aggregate upon contact with the ink composition is applied to the recording medium, so that it is brought into contact with the ink composition with each other to form an image. In this step, the dispersed particles in the ink composition, such as the polymer particles and the coloring material (e.g., a pigment), are aggregated to form an image fixed on the recording medium. Each component of the treating liquid and exemplary embodiments has been described in detail above.

The treating liquid may be applied using conventional methods such as coating methods, ink-jet methods and immersion methods. Coating methods may be performed using a bar coater, an extrusion die coater, an air doctor coater, a bread coater, a rod coater, a knife coater, a squeeze coater, a reverse roll coater, a bar coater, or the like, according to conventional coating methods. Ink-jet methods have been described in detail above.

The treating liquid applying step may be performed before or after the ink applying step using the ink composition.

In an embodiment of the ink-jet recording method, applying the ink composition (the ink composition applying step) is preferably conducted after applying a treating liquid (the treating liquid applying step). That is, in an embodiment, the treating liquid for aggregating the liquid composition (particularly, particles of a pigment or the like contained in the liquid composition) is applied on a recording medium before the liquid composition is applied on the recording medium, and applying the liquid composition so as to be in contact with the treating system applied on the recording medium thereby forming an image. This can increase ink-jet recording speed and provide an image of high density and resolution even at high speed recording.

The amount of application of the treating liquid is preferably such that the aggregating component (e.g., a divalent or polyvalent carboxylic acid or a divalent or polyvalent cationic organic compound) can be applied in an amount of 0.1 g/m$^2$ or more, while it is not particularly limited as long as the ink composition can be aggregated. In particular, the aggregating component is preferably applied in an amount of from 0.1 g/m$^2$ to 1.0 g/m$^2$, more preferably from 0.2 g/m$^2$ to 0.8 g/m$^2$. When the amount of application of the aggregating component is 0.1 g/m$^2$ or more, the aggregation reaction can proceed well. When it is 1.0 g/m$^2$ or less, the glossiness will not become too high, which is preferred.

In the invention, the ink applying step is preferably performed after the treating liquid applying step. In a preferred mode, the treating liquid is applied to the recording medium, and then the step of drying the treating liquid on the recording medium by heating is performed before the ink composition is applied. When the treating liquid is previously dried by heating before the ink applying step, running and so on can be prevented, so that the coloring ability of the ink can be improved, which allows visible image recording with good color density and hue.

The drying by heating may be performed using conventional heating means such as a heater, air blowing means such as a drier, or a combination thereof. For example, the heating method may be a method of applying heat from a heater or the like to the opposite side of the recording medium from the treating liquid-coated side, a method of applying warm air or hot air to the treating liquid-coated side of the recording medium, a method of heating with an infrared heater, or any combination thereof.

<Thermally Fixing Step>

The ink-jet recording method of the invention preferably further includes the step of bringing a heating surface into contact with the ink image formed by the application of the ink composition to thermally fix the ink image. The thermally fixing treatment facilitates the fixation of the image on the recording medium, so that the scratch resistance of the image can be further improved.

The heating is preferably applied at a temperature equal to or higher than the glass transition temperature (Tg) of the polymer particles in the image. Since the polymer particles are heated to a temperature equal to or higher than the glass transition temperature (Tg), they can be formed into a film to strengthen the image. The heating temperature is, preferably, in a temperature range of Tg+10° C. or higher. Specifically, the heating temperature is preferably in a range from 40° C. to 150° C., more preferably, in a range from 50° C. to 100° C. and, further preferably, in a range from 60° C. to 90° C.

For surface smoothing, the pressure applied together with the heat is preferably in the range of from 0.1 MPa to 3.0 MPa, more preferably from 0.1 MPa to 1.0 MPa, further preferably from 0.1 MPa to 0.5 MPa.

Preferred examples of the heating method include, but are not limited to, a method of heating with a heating element such as a Nichrome wire heater, a method of supplying warm or hot air, a method of heating with a halogen lamp, an infrared lamp, or the like, and a non-contact drying method. Preferred examples of the method of applying heat and pressure include, but are not limited to, methods of fixing by contact heating, such as a method of pressing a heating plate against the image-forming side of the recording medium and a method including: providing a heating and pressurizing apparatus that includes a pair of heating and pressurizing rollers, a pair of heating and pressurizing belts, or a heating and pressurizing belt placed on the image recording side of the recording medium and a holding roller placed on the opposite side; and allowing the recording medium to pass between the pair of rollers or the like.

In a case of applying heat and pressure, a preferred nip time is from 1 msec to 10 sec, more preferably, from 2 msec to 1 sec and, further preferably, from 4 msec to 100 sec. Further, a nip width is, preferably, from 0.1 mm to 100 mm, more preferably, from 0.5 mm to 50 mm and, further preferably, from 1 mm to 10 mm.

The heating and pressurizing roller may be a metal roller made of metal or include a metal core and an elastic material coating layer provided around the core, or if necessary, a surface layer (also referred to as "release layer"). In the latter case, for example, the metal core may be a cylindrical member made of iron, aluminum, SUS, or the like, and at least part of the surface of the metal core is preferably covered with the coating layer. In particular, the coating layer is preferably made of a silicone resin or fluororesin having releasability. A heating element is preferably incorporated in the metal core of one of the heating and pressurizing rollers. The recording medium may be allowed to pass between the rollers so that heating and pressurizing can be performed at the same time, or if necessary, two heating rollers may be used to heat the recording medium between them. For example, the heating element is preferably a halogen lamp heater, a ceramic heater, a Nichrome wire heater, or the like.

The belt substrate to form the heating and pressurizing belt for use in the heating and pressurizing apparatus is preferably a seamless electroformed nickel substrate, and the thickness of the substrate is preferably from 10 µm to 100 µm. Besides nickel, aluminum, iron, polyethylene, or the like may also be used to form the belt substrate. When the silicone resin or fluororesin is used, the layer made of the resin preferably has a thickness of from 1 µm to 50 µm, more preferably from 10 µm to 30 µm.

The pressure (nip pressure) may be attained, for example, by selecting a resilient member such as a spring having a tension and disposing the resilient member on both roller ends of the heating and pressurizing rollers such that a desired nip pressure is obtained taking the nip gap into consideration.

The transporting speed of the recording medium in a case of using the heating and pressurizing roller or the heating and pressurizing belt is, preferably, in a range from 200 mm/sec to 700 mm/sec, more preferably, from 300 mm/sec to 650 mm/sec and, further preferably, from 400 mm/sec to 600 mm/sec.

<Recording Medium>

In the ink-jet recording method of the invention, the image is recorded on a recording medium.

The recording medium to be used may be, but not limited to, a sheet of cellulose-based general printing paper, such as so-called high-quality paper, coated paper, or art paper, for use in general offset printing. When cellulose-based general printing paper is used in image recording by general ink-jet method with aqueous ink, the ink may be absorbed and dried relatively slowly so that the coloring material may be more likely to migrate after the deposition, which may easily lead to image quality degradation. According to the ink-jet recording method of the invention, however, the migration of the coloring material can be suppressed so that high-quality image recording with good color density and hue can be achieved.

Generally commercially available recording media may be used, examples of which include wood free paper (A) such as OK Prince High-Quality (trade name) manufactured by Oji paper Co., Ltd., Shiorai (trade name) manufactured by Nippon Paper Industries Co., Ltd. and New NPI High-Quality (trade name) manufactured by Nippon Paper Industries Co., Ltd.; lightly coated paper such as OK Ever Light Coat (trade name) manufactured by Oji paper Co., Ltd. and Aurora S (trade name) manufactured by Nippon Paper Industries Co., Ltd.; lightweight coated paper (A3) such as OK Coat L (trade name) manufactured by Oji paper Co., Ltd. and Aurora L (trade name) manufactured by Nippon Paper Industries Co., Ltd.; coated paper (A2, B2) such as OK Top Coat+(trade name) manufactured by Oji paper Co., Ltd. and Aurora Coat (trade name) manufactured by Nippon Paper Industries Co., Ltd.; and art paper (A1) such as OK Kanafuji+ (trade name) manufactured by Oji paper Co., Ltd. and Tokuhishi Art (trade name) manufactured by Mitsubishi Papers Mills Ltd. Various types of photo paper for ink-jet recording may also be used.

In particular, the effect of suppressing coloring material migration should be relatively large, and high-quality images with better color intensity and hue than the conventional ones should be obtained. From this point of view, the recording medium preferably has a water absorption coefficient Ka of from 0.05 mL/m²·ms$^{1/2}$ to 0.5 mL/m²·ms$^{1/2}$, more preferably from 0.1 mL/m²·ms$^{1/2}$ to 0.4 mL/m²·ms$^{1/2}$, further preferably from 0.2 mL/m²·ms$^{1/2}$ to 0.3 mL/m²·ms$^{1/2}$.

The water absorption coefficient Ka has the same meaning as described in JAPAN TAPPI Paper and Pulp Test Method No. 51: 2000 (issued by Japan Technical Association of the Pulp and Paper Industry). Specifically, the absorption coefficient Ka may be determined by calculating the difference between the amounts of transfer of water at contact time 100 ms and contact time 900 ms each measured with an automatic scanning liquid absorption meter KM500Win (trade name, manufactured by Kumagai Riki Kogyo Co., Ltd.).

Among the recording medium, a coated paper sheet for use in general offset printing is particularly preferred. Coated paper is produced by applying a coating material to the surface of non-surface-treated cellulose-based general wood-free paper, neutralized paper or the like so that a coating layer can be formed thereon. In general aqueous ink-jet image forming, coated paper may be more likely to cause problems with quality such as image glossiness or scratch resistance. In the ink-jet recording method of the invention, however, uneven glossiness can be reduced, and images with good glossiness and scratch resistance can be obtained. In particular, coated paper including base paper and a coating layer containing kaolin and/or calcium bicarbonate is preferably used. More specifically, art paper, coated paper, lightweight coated paper, or lightly coated paper is more preferred.

EXAMPLES

The invention will be described in detail by way of examples but the invention is not limited to the following examples so long as they are within the gist of the invention. Unless otherwise specified, "part" is based on mass.

The weight average molecular weight was measured by gel permeation chromatography (GPC). In GPC, HLC-802OGPC (trade name, manufactured by Tosoh Corporation) was used, and 3 pieces of TSKgel Super Multipore HZ-H connected in series (trade name, manufactured by Tosoh Corporation, 4.6 mm ID×15 cm) were used as the column, and THF (tetrahydrofuran) was used as an eluate. Further, the measurement was performed by using an IR detector under the conditions at a sample concentration of 0.35 mass %, a flow rate of 0.35 mL/min, a sample ejection amount of 10 µL, and a measuring temperature of 40° C. A calibration curve was prepared based on eight samples of "standard sample TSK: standard, polystyrene" of "F-40", "F-20", "F-4", "F-1", "A-5000", "A-2500", "A-1000", and "n-propylbenzene" manufactured by Tosoh Corporation.

Example 1

(Preparation of Aqueous Ink)

Synthesis of Polymer Dispersant P-1

A polymer dispersant P-1 was synthesized as shown below according to the following scheme:

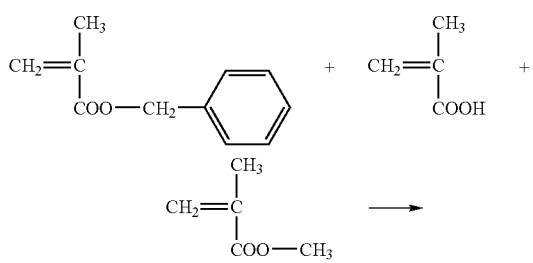

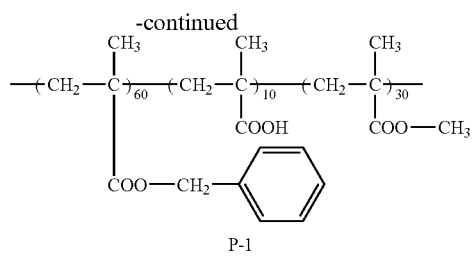

P-1

88 g of methyl ethyl ketone was put in a 1000 mL three-necked flask equipped with a stirrer and a cooling tube and heated to 72° C. in a nitrogen atmosphere, to which a solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was dropped over 3 hr. After completing the dropping and further allowing the mixture to react for 1 hr, a solution in which 0.42 g of dimethyl-2,2'-azobisisobutyrate was dissolved in 2 g of methyl ethyl ketone was added, and the mixture was heated for 4 hr while elevating the temperature to 78° C. The obtained reaction solution was re-precipitated twice in a great excess of hexane and a precipitated resin was dried, thereby obtaining 96 g of a polymer dispersant P-1.

The composition of the obtained resin was confirmed by $^1$H-NMR and the weight average molecular weight (Mw) determined by GPC was 44,600. Further, when an acid value was determined according to the method described in JIS standards (JISK0070:1992, the disclosure of which is incorporated by reference herein), the obtained resin was revealed having an acid value of 65.2 mgKOH/g.

(Preparation of Dispersion C of Resin-Coated Pigment Particles)

Ten parts of Pigment Blue 15:3 (Phthalocyanine Blue A220 (trade name), a cyan pigment, manufactured by Dainichiseika Color & Chemicals Mfg, Co., Ltd.), 5 parts of the polymer dispersant P-1, 42 parts of methyl ethyl ketone, 5.5 parts of an aqueous 1 N NaOH solution, and 87.2 parts of ion-exchanged water were mixed and dispersed with 0.1 mmφ zirconia beads for 2 hours to 6 hours in a bead mill.

Methyl ethyl ketone was removed from the resulting dispersion under reduced pressure at 55° C. After part of the water was further removed, the dispersion was centrifuged at 8,000 rpm for 30 minutes using a 50 mL centrifuge tube in a high-speed centrifugal refrigerating machine 7550 (trade name, manufactured by KUBOTA Manufacturing Corporation), and the supernatant separated from the precipitate was collected. The pigment concentration was then determined from the absorption spectrum. As a result, a dispersion C of resin-coated pigment particles (the pigment coated with the polymer dispersant) was obtained, whose pigment concentration was 10.2 mass %.

(Preparation of Dispersion M of Resin-Coated Pigment Particles)

A dispersion M of resin-coated pigment particles (a polymer dispersant-coated pigment) was prepared using the process of preparing the dispersion C of the resin-coated pigment particles, except that Pigment Red 122 (a magenta pigment) was used in place of Pigment Blue 15:3 (a cyan pigment).

(Preparation of Dispersion Y of Resin-Coated Pigment Particles)

A dispersion Y of resin-coated pigment particles (a polymer dispersant-coated pigment) was prepared using the process of preparing the dispersion C of the resin-coated pigment particles, except that Pigment Yellow 74 (a yellow pigment) was used in place of Pigment Blue 15:3 (a cyan pigment).

(Preparation of Dispersion K of Resin-Coated Pigment Particles) A dispersion K of resin-coated pigment particles (a polymer dispersant-coated pigment) was prepared using the process of preparing the dispersion C of the resin-coated pigment particles, except that carbon black (NIPEX 160-IQ (trade name), a black pigment, manufactured by Degussa) was used in place of Pigment Blue 15:3 (a cyan pigment).

(Preparation of Self-Dispersing Polymer Fine Particles)

Synthesis Example 1

To a 2 three-neck flask equipped with a stirrer, a thermometer, a reflux condenser, and a nitrogen gas introducing tube, 360.0 g of methyl ethyl ketone was added, and heated to 75° C. A mixture solution of 180 g of methyl methacrylate, 32.4 g of methoxyethyl acrylate, 126.0 g of benzyl methacrylate, 21.6 g of methacrylic acid, 72 g of methyl ethyl ketone, and 1.44 g of V-601 (trade name, manufactured by Wako Pure Chemical Industries, Ltd.) was added dropwise thereto at a constant velocity such that the addition could be completed in 2 hours. After the addition was completed, a solution of 0.72 g of V-601 and 36.0 g of methyl ethyl ketone was added and stirred at 75° C. for 2 hours. A solution of 0.72 g of V-601 and 36.0 g of methyl ethyl ketone was further added and stirred at 75° C. for 2 hours. The mixture was then heated to 85° C. and further stirred for 2 hours, so that a methyl methacrylate/methoxyethyl acrylate/benzyl methacrylate/methacrylic acid (50/9/35/6 in mass ratio) copolymer resin solution was obtained.

The weight average molecular weight (Mw) of the resulting copolymer was 66,000 (determined as a polystyrene-equivalent molecular weight by gel permeation chromatography (GPC)).

Then, 668.3 g of the resulting resin solution was weighed and added to a reaction vessel, and 388.3 g of isopropanol and 145.7 ml of an aqueous 1 mol/L NaOH solution were added thereto. The temperature in the reaction vessel was raised to 80° C. Then, 720.1 g of distilled water was added dropwise to the mixture at a rate of 20 ml/minute to form an aqueous dispersion. The aqueous dispersion was kept under the atmospheric pressure in the reaction vessel at a temperature of 80° C. for 2 hours, 85° C. for 2 hours and 90° C. for 2 Thereafter, the pressure in the reaction vessel was reduced, and isopropanol, methyl ethyl ketone and distilled water were removed in a total amount of 913.7 g by distillation, so that an aqueous dispersion B-01Lx of self-dispersing polymer fine particles (B-01) was obtained, which had a solids content of 28.0%.

The $\text{MFT}^{disp}$ of the resulting aqueous dispersion B-01Lx and the $\text{MFT}^{25\% \ aq}$ of the self-dispersing polymer fine particles (B-01) were each measured by the method described below. The measured values are shown in Table 1 below.

(1) $\text{MFT}^{disp}$ (the MFT of the particles in the aqueous dispersion): The $\text{MFT}^{disp}$ was measured using a MFT meter manufactured by YOSHIMITU SEIKI K.K. Specifically, the MFT disp was measured as shown below. The concentration of each resulting aqueous dispersion was adjusted to 25 mass %. The dispersion was then applied to a PET film (64 cm×18 cm) with a blade so as to form a 300 μm-thick coating (50 cm long×3 cm wide). The coating was then heated from the back side of the PET film so that a temperature gradient of from 12° C. to 65° C. was applied to the coating, while the coating was dried for 4 hours under an environment at 20° C. and 22% RH. In this process, the boundary temperature (° C.) between the temperature where a white powder precipitate was produced and the temperature where a transparent film was formed was measured and defined as the minimum filming temperature ($\text{MFT}^{disp}$)

(2) MFT$^{25\% \ aq}$ (the MFT of the particles in a solution containing 25 mass % of a hydrophilic organic solvent): The MFT$^{25\% \ aq}$ was determined using the process of measuring the MFT$^{disp}$, except that an aqueous solution of 25 mass % (solid mass) of the self-dispersing polymer fine particles (B-01) or (B-02), 6.25 mass % (total amount) of the solvent(s) used in each ink composition shown in Table 1, and 70 mass % of water was prepared and used in place of the aqueous dispersion.

Synthesis Example 2

A methyl methacrylate/methoxyethyl acrylate/benzyl methacrylate/methacrylic acid (39/20/35/6 in mass ratio) copolymer resin solution and an aqueous dispersion B-02Lx of self-dispersing polymer fine particles (B-02) with a solids content of 28.0% were obtained using the process of Synthesis Example 1, except that the ratio between methyl methacrylate, methoxyethyl acrylate, benzyl methacrylate, and methacrylic acid in the synthesis of self-dispersing polymer fine particles (B-01) was changed.

The weight average molecular weight (Mw) of the resulting copolymer was 70,000 (determined as a polystyrene-equivalent molecular weight by gel permeation chromatography (GPC)). The MFT$^{disp}$ of the resulting aqueous dispersion B-02Lx and the MFT$^{25\% \ aq}$ of the self-dispersing polymer fine particles (B-02) were also measured by the same method as described above. The measured values are shown in Table 1 below.

Synthesis Example 3

A methyl methacrylate/methoxyethyl acrylate/benzyl methacrylate/methacrylic acid (44/15/35/6 in mass ratio) copolymer resin solution and an aqueous dispersion B-03Lx of self-dispersing polymer fine particles (B-03) with a solids content of 28.0% were obtained using the process of Synthesis Example 1, except that the ratio between methyl methacrylate, methoxyethyl acrylate, benzyl methacrylate, and methacrylic acid in the synthesis of self-dispersing polymer fine particles (B-01) was changed.

(Preparation of Aqueous Ink)

Materials used were the pigment particle dispersions obtained as described above (the cyan dispersion C, the magenta dispersion M, the yellow dispersion Y, and the black dispersion K), the dispersion B-01Lx of the self-dispersing polymer fine particles (B-01), the dispersion B-02Lx of the self-dispersing polymer fine particles (B-02), and the dispersion B-03Lx of the self-dispersing polymer fine particles (B-03). Each set of components were mixed to form the ink composition shown below so that aqueous ink of each color was prepared. The resulting aqueous ink was charged into a disposable plastic syringe and then filtrated through a polyvinylidene fluoride (PVDF) filter with a pore size of 5 μm (Millex-SV (trade name), 25 mm in diameter, manufactured by Millipore Corporation) to give a final ink product.

| (Composition of Cyan Ink C-1) | |
|---|---|
| Cyan pigment (Pigment Blue 15:3) | 4 mass % |
| Polymer dispersant P-1 (solid content) | 2 mass % |
| Aqueous dispersion B-01Lx of self-dispersing polymer fine particles B-01 | 4 mass % |

| (Composition of Cyan Ink C-1) | |
|---|---|
| Sannix GP250 (trade name, hydrophilic organic solvent, manufactured by Sanyo Chemical Industries, Ltd.) | 10 mass % |
| Tripropylene glycol monomethyl ether (TPGmME) (hydrophilic organic solvent, manufactured by Wako Pure Chemical Industries, Inc.) | 6 mass % |
| Olfine E1010 (trade name, surfactant, manufactured by Nissin Chemical Industry Co., Ltd.) | 1 mass % |
| Ion-exchanged water | 73 mass % |

Composition of Cyan Ink C-2

The composition of cyan ink C-2 was the same as that of cyan ink C-1, except that tripropylene glycol monomethyl ether (TPGmME) was replaced with Sannix GP250 (trade name, manufactured by Sanyo Chemical Industries, Ltd.).

Composition of Cyan Ink C-3

The composition of cyan ink C-3 was the same as that of cyan ink C-1, except that the aqueous dispersion B-01Lx of the self-dispersing polymer fine particles B-01 was replaced with the aqueous dispersion B-02Lx of the self-dispersing polymer fine particles B-02.

Composition of Cyan Ink C-4

The composition of cyan ink C-4 was the same as that of cyan ink C-2, except that the aqueous dispersion B-01Lx of the self-dispersing polymer fine particles B-01 was replaced with the aqueous dispersion B-02Lx of the self-dispersing polymer fine particles B-02.

Composition of Cyan Ink C-5

The composition of cyan ink C-5 was the same as that of cyan ink C-1, except that the aqueous dispersion B-01Lx of the self-dispersing polymer fine particles B-01 was replaced with the aqueous dispersion B-03Lx of the self-dispersing polymer fine particles B-01 and that the solvents were changed as shown in Table 1 below.

Composition of Cyan Ink C-6

The composition of cyan ink C-6 was the same as that of cyan ink C-1, except that the aqueous dispersion B-01Lx of the self-dispersing polymer fine particles B-01 was replaced with the aqueous dispersion B-03Lx of the self-dispersing polymer fine particles B-1 and that the solvents were changed as shown in Table 1 below.

Composition of Magenta Ink M-1

The composition of magenta ink M-1 was the same as that of cyan ink C-1, except that the cyan pigment was replaced with the same amount of a magenta pigment (Pigment Red 122).

Composition of Yellow Ink Y-1

The composition of yellow ink Y-1 was the same as that of cyan ink C-1, except that the cyan pigment was replaced with the same amount of a yellow pigment (Pigment Yellow 74).

Composition of Black Ink K-1

The composition of black ink K-1 was the same as that of cyan ink C-1, except that the cyan pigment was replaced with the same amount of a black pigment (carbon black).

Composition of Cyan Ink C-11

The composition of cyan ink C-11 was the same as that of cyan ink C-1, except that Sannix GP250 (10%) and TPGmME (6%) were replaced with 10% of Sannix GP400 (trade name, manufactured by Sanyo Chemical Industries, Ltd.) and 6% of triethylene glycol monobutyl ether (TEGmBE).

TABLE 1

| | Polymer fine particles | Ink solvent (mass %) | MFT$^{disp}$ | MFT$^{25\% \, aq}$ |
|---|---|---|---|---|
| Cyan ink C-1 | BL-01Lx | GP250(10)/TPGmME(6) | 75° C. | 25° C. |
| Cyan ink C-2 | BL-01Lx | GP250(16) | 75° C. | 40° C. |
| Cyan ink C-3 | BL-02Lx | GP250(10)/TPGmME(6) | 55° C. | 10° C. or less |
| Cyan ink C-4 | BL-02Lx | GP250(16) | 55° C. | 18° C. |
| Cyan ink C-5 | BL-03Lx | GP250(13)/TPGmME(3) | 65° C. | 25° C. |
| Cyan ink C-6 | BL-03Lx | GP250(16) | 65° C. | 30° C. |
| Cyan ink C-11 | BL-01Lx | GP400(10)/TEGmBE(6) | 75° C. | 23° C. |
| Magenta ink M-1 | BL-01Lx | GP250(10)/TPGmME (6) | 75° C. | 25° C. |
| Yellow ink Y-1 | BL-01Lx | GP250(10)/TPGmME(6) | 75° C. | 25° C. |
| Black ink K-1 | BL-01Lx | GP250(10)/TPGmME(6) | 75° C. | 25° C. |

MFT$^{disp}$: MFT of the particles in an aqueous dispersion
MFT$^{25\% \, aq}$: MFT of the particles in a mixed solution containing water and 25 mass % of the hydrophilic organic solvent based on the solid content of the polymer Each resulting aqueous ink was measured for surface tension, viscosity, volume average particle size, and pH. The physical property values are shown in Table 2 below.

The surface tension was measured using Automatic Surface Tensiometer CBVP-Z (trade name, manufactured by Kyowa Interface Science Co., LTD.) and a platinum plate by Wilhelmy method under 25° C. conditions.

The viscosity was measured under 30° C. conditions using VISCOMETER TV-22 (TOKI SANGYO CO., LTD.).

The volume average particle size was measured as follows. Each resulting aqueous ink was diluted, as necessary, to a concentration suitable for the measurement, and then measured for volume average particle size under the same condition by dynamic light scattering method with an ultrafine particle size distribution analyzer Nanotrack UPA-EX150 (trade name, manufactured by Nikkiso Co., Ltd.).

The pH was measured for the undiluted aqueous ink at 25° C. with a pH meter WM-50EG (trade name) manufactured by DKK-TOA CORPORATION.

TABLE 2

| | Viscosity [mPa · s] | Surface tension [mN/m] | Volume average particle size [μm] | pH |
|---|---|---|---|---|
| Cyan ink C-1 | 3.1 | 35.4 | 91.3 | 9.0 |
| Cyan ink C-2 | 3.2 | 35.5 | 92.2 | 9.0 |
| Cyan ink C-3 | 3.1 | 35.4 | 90.8 | 9.0 |
| Cyan ink C-4 | 3.2 | 35.9 | 92.4 | 9.0 |
| Cyan ink C-5 | 3.2 | 35.4 | 90.8 | 9.0 |
| Cyan ink C-6 | 3.1 | 35.4 | 94.2 | 9.0 |
| Cyan ink C-11 | 3.3 | 34.6 | 90.7 | 9.0 |
| Magenta ink M-1 | 3.5 | 35.4 | 81.8 | 9.1 |
| Yellow ink Y-1 | 3.2 | 35.5 | 94.2 | 9.0 |
| Black ink K-1 | 3.1 | 35.4 | 71.6 | 9.3 |

(Preparation of Treating Liquid)

Treating liquids (1) and (2) were prepared as shown below. The surface tension, viscosity and pH were each measured by the same method as described above.

Preparation of Treating Liquid (1)

The respective components were mixed to form the composition below so that treating liquid (1) was prepared. The physical property values of treating liquid (1) were as follows: viscosity, 2.6 mPa·s; surface tension, 37.3 mN/m; pH, 1.6.

| Composition of Treating Liquid (1) | |
|---|---|
| Malonic acid (a divalent carboxylic acid, manufactured by Wako Pure Chemical Industries, Ltd.) | 15.0 mass % |
| Diethylene glycol monomethyl ether (manufactured by Wako Pure Chemical Industries, Ltd.) | 20.0 mass % |
| Sodium N-oleoyl-N-methyltaurate (surfactant) | 1.0 mass % |
| Ion-exchanged water | 64.0 mass % |

Preparation of Treating Liquid (2)

The respective components were mixed to form the composition below so that treating liquid (2) was prepared. The physical property values of treating liquid (2) were as follows: viscosity, 2.7 mPa·s; surface tension, 58.4 mN/m; pH, 3.0.

| Composition of Treating Liquid (2) | |
|---|---|
| Calcium nitrate tetrahydrate (a divalent metal ion) | 34.0 mass % |
| Diethylene glycol | 10.0 mass % |
| Methanol | 5.0 mass % |
| Ion-exchanged water | 51.0 mass % |

(Image Recording and Evaluation)

As described below, images were recorded, and evaluations were performed. The results of the evaluations are shown in Table 3 below.

1. Ejection Reliability

A GEL JET GX5000 printer head (trade name, full line head manufactured by Ricoh Company, Ltd.) was provided, and the storage tank connected thereto was refilled with the aqueous ink obtained as described above. An evaluation sample was prepared by printing 96 lines (each 10 cm in length) on a recording medium under the conditions of an ink droplet amount of 3.5 pL, an ejection frequency of 24 kHz, and a resolution of 75 dpi (nozzle arrangement direction)×1200 dpi (feeding direction). The recording medium used was GASAI Photo Finish Pro (trade name, manufactured by FUJIFILM Corporation). The distances between the 96 lines were measured at the site 5 cm away from the deposition start point in the evaluation sample using a dot analyzer DA-6000 (trade name, manufactured by Oji Scientific Instruments), and their standard deviation was calculated (initial ejection performance). After the printing to prepare of the evaluation sample, the printer head was allowed to stand under an environment at 25° C. and 55% RH so that the deposition was suspended for 10 minutes. Printing was then performed under the same condition to prepare another evaluation sample. The standard deviation of the distances between the 96 lines at the site 5 cm away from the deposition start point in the evaluation sample was also calculated in the same way, and the calculated value after the suspension was used as an index to evaluate the ejection reliability.

In the evaluation, the cyan ink was pre-warmed in a warm bath at 30° C. and then charged into the storage tank connected to the printer head. The printer head was placed in a thermostatic chamber so that the ejection temperature could be kept at 30° C., and the ink was ejected at a temperature of 30° C. in each case. The standard deviation calculated as described above after the suspension was used to evaluate the ejection reliability according to the following criteria.

Evaluation Criteria
A: from 3 μm or more to less than 4 μm
B: from 4 μm to or more less than 5 μm
D: 5 μm or more 2. Blocking A GEL JET GX5000 printer head (full line head manufactured by Ricoh Co.) was provided and the storage tanks connected thereto were re-packed by Cyan Aqueous Inks obtained as described above. TOKUHISHI ART DOUBLE-SIDED N (manufactured by Mitsubishi Papers Mills Ltd.) was fixed as a recording medium on a stage capable of moving in a predetermined linear direction at 500 mm/sec, to which the treating liquid obtained as described above (citric acid: 0.84 g/m$^2$) was coated by a wire bar coater to a thickness of about 5 μm, and dried at 50° C. for 2 sec just after coating. Then, the GELJET GX5000 printer head (full line head manufactured by Ricoh Co.) was fixed and arranged such that the direction of the line head where nozzles were arranged (main scanning direction) was inclined at 75.7° to a direction in perpendicular to the moving direction of the stage (sub-scanning direction) and the ink was ejected by a line system under the ejection conditions at an ink droplet amount of 3.5 pL, at an ejection frequency of 24 kHz, and at a resolution of 1200 dpi×600 dpi while moving the recoding medium at a constant speed in the sub-scanning direction, thereby printing a solid image. Just after printing, the recording medium on which the image was printed was dried at 60° C. for 3 sec, and was further passed between a pair of fixing rollers heated to 60° C., thereby performing a fixing treatment at a nip pressure of 0.25 MPa for a nip width of 4 mm. Thus, a sample for evaluation was obtained. The pair of fixing rollers include a heating roll in which the surface of a cylindrical core metal made of SUS was coated with a silicone resin and a halogen lamp was disposed in the inside of the cylindrical core metal, and a counter roll that press-contacts with the heating roll.

Then, the obtained sample for evaluation was cut into 3.5 cm×4 cm size, the sample for evaluation was placed with its printed surface being upward on an acryl plate of 10 cm×10 cm and, further, 10 pieces of not-printed TOKUHISHI ART DOUBLE-SIDED N (manufactured by Mitsubishi Paper Mills Ltd.) cut into the same size as the sample for evaluation was stacked above the sample for evaluation, further, an acryl plate of 10 cm×10 cm was placed, and they were left under the circumstantial condition at 50° C., 60% RH for 12 hr. After that, a weight of 1 kg was placed on the uppermost acryl plate and left for further 24 hr (corresponding to 700 kg/M$^2$ of weight). Thereafter, after storage under the circumstantial condition at 25° C. and 50% RH for further 2 hr, the not-printed TOKUHISHI ART (not printed paper) stacked above the sample for evaluation was peeled. The easiness in peeling and the color transfer after peeling were observed with naked eyes and evaluated in accordance with the following evaluation criteria.

<Evaluation Criteria>
A: Peeled easily and no color transfer to not-printed paper was observed
B: Resistance was felt when peeling due to sticking but no color transfer to the not-printed paper was observed.
C: Sticking occurred and slight color transfer to the not-printed paper was observed
D: Strong sticking occurred and remarkable color transfer to the not-printed paper was observed.

3. Scratch Resistance

Not-printed TOKUBISHI ART(trade name, manufactured by Mitsubishi Paper Mills Limited) cut to 10 mm×50 mm was wound around a paper weight (weight: 470 g, sized 15 mm×30 mm×120 mm) (the area in which not-printed TOKUBISHI ART and the sample for evaluation were contacted was 150 mm$^2$), and the sample for evaluation prepared in the evaluation in "2. blocking" was rubbed in reciprocation for three times (corresponding to 260 kg/m$^2$ of load). The printed surface after rubbing was observed with naked eyes and evaluated in accordance with the following evaluation criteria.

<Evaluation Criteria>
A: Peeling of image (coloring material) is not observed visually on the printed surface
D: Peeling of image (coloring material) is observed visually on the printed surface.

TABLE 3

| No | Ink name | Blocking | Scratch resistance | Ejection reliability | Remarks |
|---|---|---|---|---|---|
| 1 | Cyan ink C-1 | A | A | A | Invention |
| 2 | Cyan ink C-2 | A | D | A | Comparative Example |
| 3 | Cyan ink C-3 | D | A | D | Comparative Example |
| 4 | Cyan ink C-4 | D | A | D | Comparative Example |
| 5 | Cyan ink C-5 | A | A | A | Invention |
| 6 | Cyan ink C-6 | A | D | A | Comparative Example |
| 7 | Cyan ink C-11 | A | A | A | Invention |
| 8 | Magenta ink M-1 | A | A | A | Invention |
| 9 | Yellow ink Y-1 | A | A | A | Invention |
| 10 | Black ink K-1 | A | A | A | Invention |

Table 3 shows that in all the cases using the ink compositions according to the invention, an image with high scratch resistance was obtained with reduced thermal energy, while blocking was suppressed. In these cases, the ejection reliability was also good. In the comparative examples, however, it was difficult to achieve both the reduction of blocking and the buildup of the scratch resistance, although ejection performance was maintained.

The invention includes the following embodiments.

<1> An ink composition, including: a coloring material; a hydrophilic organic solvent; polymer particles that have a minimum filming temperature (MFT$^{disp}$) of 60° C. or more when dispersed in water and that have a MFT$^{25\% \, aq}$ 40° C. or more lower than the MFT$^{disp}$ when mixed with water and 25 mass % of the hydrophilic organic solvent based on a solid content of the polymer; and water.

<2> The ink composition of item <1>, wherein the coloring material is a pigment.

<3> The ink composition of item <1> or <2>, wherein the coloring material is a polymer dispersant-coated pigment.

<4> The ink composition of any one of items <1> to <3>, wherein the polymer particles are self-dispersing polymer particles.

<5> The ink composition of item <4>, wherein the self-dispersing polymer includes a first polymer having a carboxy group and an acid value of from 25 to 100.

<6> The ink composition of item <5>, wherein the self-dispersing polymer particles comprise the first polymer synthesized in an organic solvent, the carboxy group of the first polymer is at least partially neutralized, and the self-dispersing polymer particles are prepared in the form of a polymer dispersion containing water as a continuous phase.

<7> The ink composition of item <4>, wherein the self-dispersing polymer particles comprises a constituent unit derived from an aromatic group-containing (meth)acrylate monomer, and the content of the constituent unit is from 10 mass % to 95 mass % based on the total mass of the self-dispersing polymer.

<8> The ink composition of item <7>, wherein the aromatic group-containing (meth)acrylate monomer is phenoxyethyl acrylate.

<9> The ink composition of item <1>, wherein the ink composition comprises at least two hydrophilic organic solvents.

<10> The ink composition of item <1>, wherein the hydrophilic organic solvent comprises (alkyleneoxy)alcohol.

<11> The ink composition of item <10>, wherein the (alkyleneoxy)alcohol is (propyleneoxy)alcohol.

<12> The ink composition of item <1>, wherein the hydrophilic organic solvent comprises (alkyleneoxy)alkyl ether.

<13> An ink set including: the ink composition of item <1>; and a treating liquid capable of forming an aggregate upon contact with the ink composition.

<14> The ink set of item <13>, wherein the treating liquid includes a divalent or polyvalent carboxylic acid or a divalent or polyvalent cationic organic compound.

<15> An ink-jet recording method including:
applying the ink composition of item <1> to a recording medium by an ink-jet method; and
applying, to the recording medium, a treating liquid capable of forming an aggregate upon contact with the ink composition.

<16> The ink-jet recording method of item <15>, further including bringing a heating surface into contact with an ink image formed by the application of the ink composition to thermally fix the ink image.

<17> The ink-jet recording method of item <15>, wherein the application of the ink composition comprises ejecting at least two ink compositions in a line system in such a way that the time interval between adjacent ejections of the respective ink compositions is set to one second or less, when an image is recorded.

<18> The ink-jet recording method of item <15>, wherein the recording medium has a water absorption coefficient Ka of from $0.05$ $mL/m^2 \cdot ms^{1/2}$ to $0.5$ $mL/m^2 \cdot ms^{1/2}$.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
a coloring material;
a hydrophilic organic solvent comprising an (alkyleneoxy) alkyl ether;
polymer particles that have a minimum filming temperature ($MFT^{disp}$) of 60° C. or more when dispersed in water and that have a MFT at least 40° C. lower than the $MFT^{disp}$ when mixed with water and 25 mass % of the hydrophilic organic solvent based on a solid content of the polymer; and
water,
wherein the polymer particles are self-dispersing polymer particles and comprise a constituent unit derived from an aromatic group-containing (meth)acrylate monomer, and the content of the constituent unit is from 10 mass % to 95 mass % based on the total mass of the self-dispersing polymer.

2. The ink composition of claim 1, wherein the coloring material is a pigment.

3. The ink composition of claim 1, wherein the coloring material is a polymer dispersant-coated pigment.

4. The ink composition of claim 1, wherein the self-dispersing polymer particles comprise a first polymer having a carboxy group and an acid value of from 25 to 100.

5. The ink composition of claim 4, wherein the self-dispersing polymer particles comprise the first polymer synthesized in an organic solvent, the carboxy group of the first polymer is at least partially neutralized, and the self-dispersing polymer particles are prepared in the form of a polymer dispersion containing water as a continuous phase.

6. The ink composition of claim 1, wherein the aromatic group-containing (meth)acrylate monomer is phenoxyethyl acrylate.

7. The ink composition of claim 1, wherein the ink composition comprises at least two hydrophilic organic solvents.

8. An ink set comprising:
the ink composition of claim 1; and
a treating liquid capable of forming an aggregate upon contact with the ink composition.

9. The ink set of claim 8, wherein the treating liquid comprises a divalent or polyvalent carboxylic acid or a divalent or polyvalent cationic organic compound.

10. An ink jet recording method comprising:
applying the ink composition of claim 1 to a recording medium by an ink jet method; and
applying, to the recording medium, a treating liquid capable of forming an aggregate upon contact with the ink composition.

11. The ink-jet recording method of claim 10, further comprising bringing a heating surface into contact with an ink image formed by the application of the ink composition to thermally fix the ink image.

12. The ink-jet recording method of claim 10, wherein the application of the ink composition comprises ejecting at least two ink compositions in a line system in such a way that the time interval between adjacent ejections of the respective ink compositions is set to at most one second, when an image is recorded.

13. The ink-jet recording method of claim 10, wherein the recording medium has a water absorption coefficient Ka of from $0.05$ $mL/m^2 ms^{1/2}$ to $0.5$ $mL/m^2 ms^{1/2}$.

14. The ink composition of claim 1, wherein the hydrophilic organic solvent comprises an (ethyleneoxy)alkyl ether having an alkyl moiety of 1 to 4 carbon atoms or a (propyleneoxy)alkyl ether having an alkyl moiety of 1 to 4 carbon atoms.

15. The ink set of claim 8, wherein the hydrophilic organic solvent of the ink composition comprises an (ethyleneoxy) alkyl ether having an alkyl moiety of 1 to 4 carbon atoms or a (propyleneoxy)allcyl ether having an alkyl moiety of 1 to 4 carbon atoms.

16. The ink jet recording method of claim 10, wherein the hydrophilic organic solvent of the ink composition comprises an (ethyleneoxy)alkyl ether having an alkyl moiety of 1 to 4 carbon atoms or a (propyleneoxy)alkyl ether having an alkyl moiety of 1 to 4 carbon atoms.

* * * * *